US010655567B2

(12) United States Patent
Folk

(10) Patent No.: US 10,655,567 B2
(45) Date of Patent: May 19, 2020

(54) SYSTEMS AND METHODS FOR PROVIDING ENGINE INTAKE MANIFOLD CONFIGURABILITY TO OPTIMIZE PERFORMANCE

(71) Applicant: Innovate Engineering LLC, Palmyra, WI (US)

(72) Inventor: Heath Folk, Palmyra, WI (US)

(73) Assignee: Innovate Engineering LLC, Palmyra, WI (US)

( * ) Notice: Subject to any disclaimer, the term of this patent is extended or adjusted under 35 U.S.C. 154(b) by 140 days.

(21) Appl. No.: 15/923,447

(22) Filed: Mar. 16, 2018

(65) Prior Publication Data
US 2018/0298849 A1 Oct. 18, 2018

Related U.S. Application Data

(60) Provisional application No. 62/484,990, filed on Apr. 13, 2017.

(51) Int. Cl.
*F02M 23/00* (2006.01)
*F02M 35/104* (2006.01)
*F02M 25/10* (2006.01)

(52) U.S. Cl.
CPC .......... *F02M 23/001* (2013.01); *F02M 25/10* (2013.01); *F02M 35/104* (2013.01); *Y02T 10/121* (2013.01); *Y02T 10/146* (2013.01)

(58) Field of Classification Search
CPC .... F02M 23/001; F02M 25/10; F02M 35/104; F02M 35/10209; Y02T 10/146; Y02T 10/121

(Continued)

(56) References Cited

U.S. PATENT DOCUMENTS

2004/0173695 A1* 9/2004 Patrick ................. F23D 11/108
239/418
2004/0250804 A1* 12/2004 Young ................. F02D 41/0025
123/585
2011/0308483 A1* 12/2011 Lafferty ................. F02M 25/10
123/41.01

OTHER PUBLICATIONS

Lohnes, Brian. "Killer New Product: The Nightmare Motorsports Stealth Nozzle—A Nitrous Breakthrough!" Bangshift.com., Jul. 2, 2010. https://bangshift.com/general-news/killer-new-product-the-nightmare-nnotorsports-stealth-nozzle-a-nitrous-breakthrough/ (accessed Feb. 14, 2018). (Year: 2010).*

(Continued)

*Primary Examiner* — Joseph J Dallo
*Assistant Examiner* — Scott A Reinbold
(74) *Attorney, Agent, or Firm* — Andrus Intellectual Property Law, LLP

(57) ABSTRACT

A system for optimizing performance of an engine, including an intake manifold with an upper mount, plenum floor defining a plenum opening, lower mount defining intake openings, and intake runners communicating between the plenum and intake openings. The upper mount may be coupled to an air inlet device and the lower mount may be coupled to a cylinder head. A mountable device has an upper portion and lower portion and is configured to be inserted through the upper mount of the intake manifold to be coupled to the plenum floor so the mountable device covers the plenum opening and at least the upper portion of the mountable device remains between the upper mount and the plenum floor. A fixation system is configured align the mountable device to the intake manifold and to prevent the mountable device from decoupling from the plenum floor during engine operation. The mountable device is interchangeable without removing the intake manifold from the cylinder head.

23 Claims, 17 Drawing Sheets

(58) Field of Classification Search
USPC .......................................................... 123/470
See application file for complete search history.

(56) References Cited

OTHER PUBLICATIONS

Lohnes, Brian. "Killer New Product: The Nightmare Motorsports Stealth Nozzle—A Nitrous Breakthrough!" Bangshift.com., Jul 2, 2010. https://bangshift.com/general-news/killer-new-product-the-nightmare-motorsports-stealth-nozzle-a-nitrous-breakthrough/ (accessed Feb. 14, 2018).

"Nitrous Outlet Nitrous Puck System". Nitrous Outlet. http://www.nitrousoutlet.com/nitrous-puck (accessed Apr. 4, 2017).

"Turtles and Super Turtles Manifold Inserts". Brodix.com. http://brodix.com/parts/turtles-and-super-turtles-manifold-inserts (accessed Apr. 4, 2017).

Wagner, Brian. "PRI 2017: Nitrous Oultet Releases the Kraken Plate System". Dragzine. http://www.dragzine.com/news/pri-2017-nitrous-outlet-releases-the-kraken-plate-system/ (accessed Mar. 15, 2018).

"Black Widow 750 V8 Spider Plate System". Wizards of NOS. http://www.noswizard.com/car-nitrous-kits/wet-car-nitrous-kits/nitrous-plate-kits/black-widow-nitrous-plate-system-750.html (accessed Mar. 16, 2018).

* cited by examiner

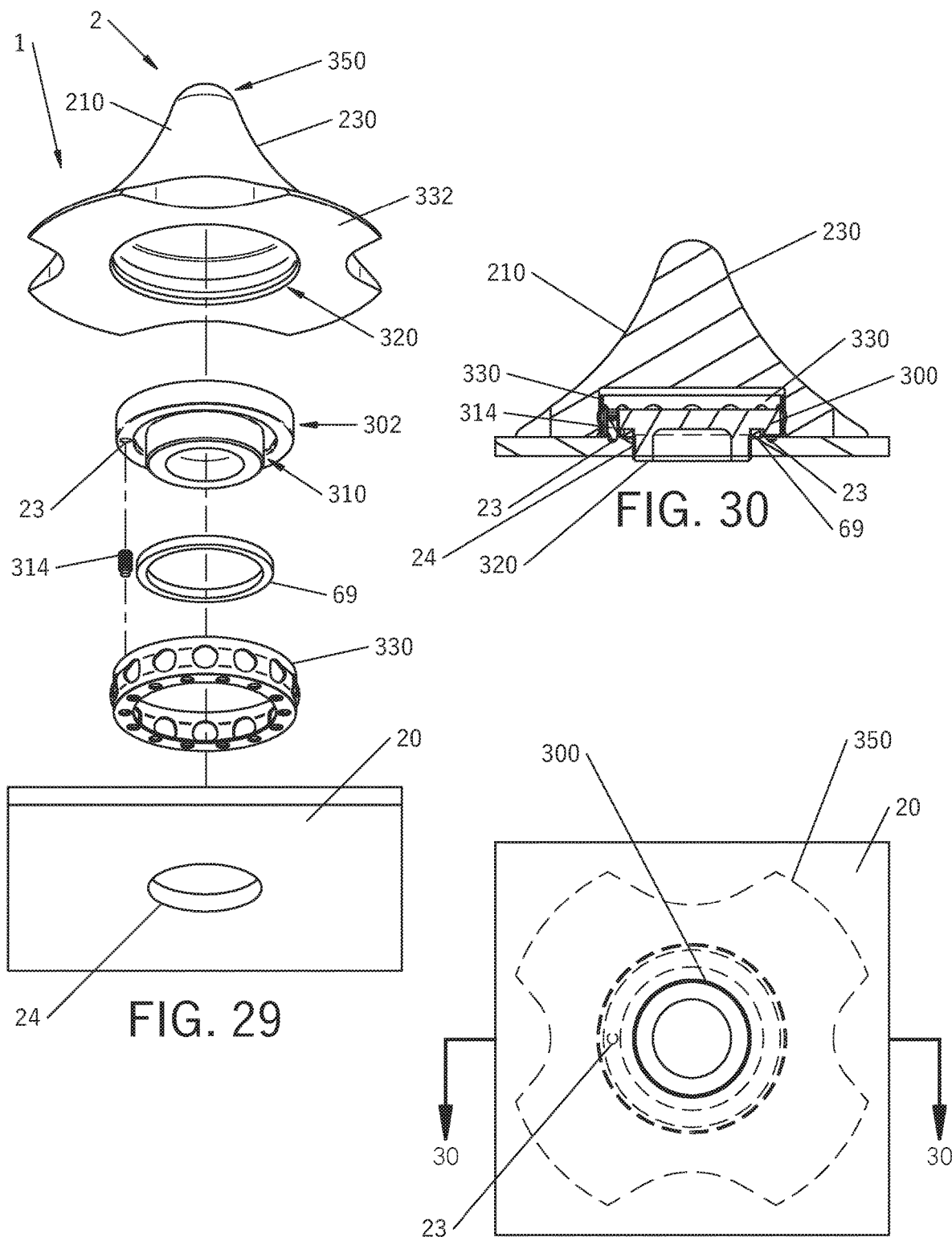

SYSTEMS AND METHODS FOR PROVIDING ENGINE INTAKE MANIFOLD CONFIGURABILITY TO OPTIMIZE PERFORMANCE

CROSS REFERENCE TO RELATED APPLICATIONS

This application claims the benefit of U.S. Provisional Patent Application No. 62/484,990, filed Apr. 13, 2017, which is incorporated herein by reference in its entirety.

FIELD

The present disclosure generally relates to systems and methods for optimizing engine performance, and more particularly to systems and methods for providing configurability of engine air and/or fuel intake manifolds to optimize engine performance.

BACKGROUND

The Background and Summary are provided to introduce a foundation and selection of concepts that are further described below in the Detailed Description. The Background and Summary are not intended to identify key or essential features of the potentially claimed subject matter, nor are they intended to be used as an aid in limiting the scope of the potentially claimed subject matter.

The performance of an internal combustion engine is heavily related to the combustion of fuel and oxygen (air) within the cylinders. Injecting nitrous oxide into the air intakes of an engine can enhance its performance by adding more oxygen into the engine, thereby allowing more fuel to combust in the cylinders. Specifically, the presence of nitrous oxide allows more fuel to be burned in a single cylinder stroke relative to the amount of fuel burned in the presence of air alone.

There are generally two types of nitrous oxide injecting devices. First, a "dry" nitrous oxide injector, injects nitrous oxide into the system to increase combustion in the cylinders, as discussed above. These dry injectors then rely upon the engine's fuel injectors to provide the additional fuel to be burned for the increased combustion desired.

Another version of a nitrous oxide injector is a "wet" injector, which in addition to injecting nitrous oxide, also provides the corresponding amount of additional fuel to the cylinders. In this manner, the wet version does not rely upon the engine's fuel injectors as in the dry version previously discussed, but provides both elements of nitrous oxide and additional fuel.

Furthermore, there are different methods or pathways for providing the nitrous oxide (herein after "nitrous") and, in the case of wet versions, the additional fuel. Two common types of injectors with respect to the delivery path are a plate type and a direct port type injector. The plate type is relatively simple and is simply mounted between the carburetor or throttle body and its upper mount at the top of the intake manifold. In contrast, the direct port type is generally more complicated, providing an individual nozzle installed in each individual cylinder.

SUMMARY

Embodiments of the present disclosure relate to a system for optimizing performance of an engine having an air inlet device and a cylinder head. The system includes an intake manifold having an upper mount, a plenum floor, a lower mount defining a plurality of intake openings, and a plurality of intake runners communicating between the plenum floor and the plurality of intake openings in the lower mount. The upper mount is configured to be coupled to the air inlet device and the lower mount is configured to be coupled to the cylinder head such that the intake manifold provides air from the air inlet device to the cylinder heads. The plenum floor defines a plenum opening. A mountable device has an upper portion and a lower portion and is configured to be inserted through the upper mount of the intake manifold and coupled to the plenum floor such that the mountable device covers the plenum opening, and such that at least the upper portion of the mountable device remains between the upper mount and the plenum floor. A fixation system is configured to prevent the mountable device from decoupling from the plenum floor during operation of the engine, wherein the fixation system further prevents misalignment between the mountable device and the intake manifold. The mountable device is interchangeable without removing the intake manifold from the cylinder head.

Additional embodiments of the present disclosure relate to a mountable device configured to mount to an intake manifold having a plenum floor and an upper mount. The intake manifold is configured to be coupled to an engine and includes an upper portion and a lower portion. The lower portion is configured to be received within a plenum opening defined within the plenum floor when the mountable device is mounted to the plenum floor. The upper portion is configured to remain between the plenum floor and the upper mount when the mountable device is mounted to the plenum floor. A fixation system is configured to be engaged and disengaged through the upper mount of the intake manifold when the mountable device is mounted to the plenum floor. The fixation system is configured to prevent the mountable device from dismounting from the plenum floor when engaged, and further configured to prevent misalignment between the mountable device and the intake manifold. The mountable device is configured to be mounted and dismounted from the plenum floor while the intake manifold remains coupled to the engine.

Another embodiment of the present disclosure relates to an intake manifold that is configurable for optimizing performance of an engine having an air inlet device and a cylinder head by receiving a mountable device. The intake manifold has an upper mount configured to be coupled to the air inlet device. A plenum floor is positioned below the upper mount and an intake cavity is defined therebetween. The plenum floor defines a plenum opening that is configured to receive a lower portion of the mountable device such that the mountable device is coupled to the plenum floor within the intake cavity. The plenum floor includes a fixation system configured to prevent the mountable device from upwardly exiting the plenum opening. A lower mount is positioned below the plenum floor and defines a plurality of intake openings therethrough. The lower mount is configured to be coupled to the cylinder head. A plurality of intake runners each communicates between the intake cavity and at least one of the plurality of intake openings in the lower mount such that air flows from the air inlet device to the cylinder heads. The fixation system is further configured to prevent misalignment between the mountable device and the intake runners. The intake manifold is configured such that the mountable device is insertable into the intake cavity through the upper mount and is configured to be coupled to the plenum floor from above the plenum floor.

BRIEF DESCRIPTION OF THE DRAWINGS

The drawings illustrate the best mode presently contemplated of carrying out the disclosure. The same numbers are used throughout the drawings to reference like features and like components. In the drawings:

FIG. 9a is a side view of an airflow device in accordance with the present disclosure;

FIG. 9b is a bottom view of the system from FIG. 9a;

FIG. 10b is a side view of the system from FIG. 10a;

FIG. 11b is a side view of the air directing and swirl device from FIG. 11a;

FIG. 12b is a side view of the air directing device with carb signal booster from FIG. 12a;

FIGS. 29-31 depict another embodiment of the system including another mountable device in accordance with the present disclosure, specifically, an embodiment of the system including an adapter piece positioned between an airflow device and the plenum floor;

DETAILED DISCLOSURE

This written description uses examples to disclose embodiments of the disclosed invention, including the best mode, and also to enable any person skilled in the art to practice or make and use the same. The patentable scope of the invention is defined by the potential claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Figure 1:
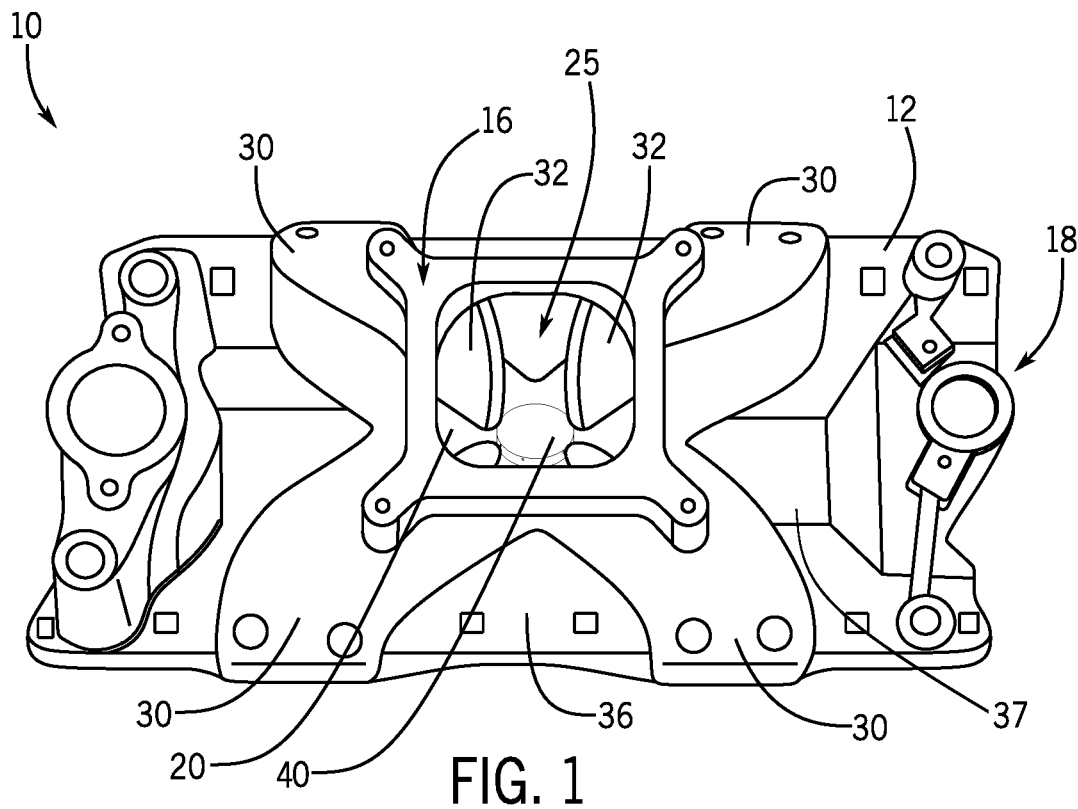
FIG. 1 is an isometric view of the top of an intake manifold for use with an internal combustion engine.
Figure 3:
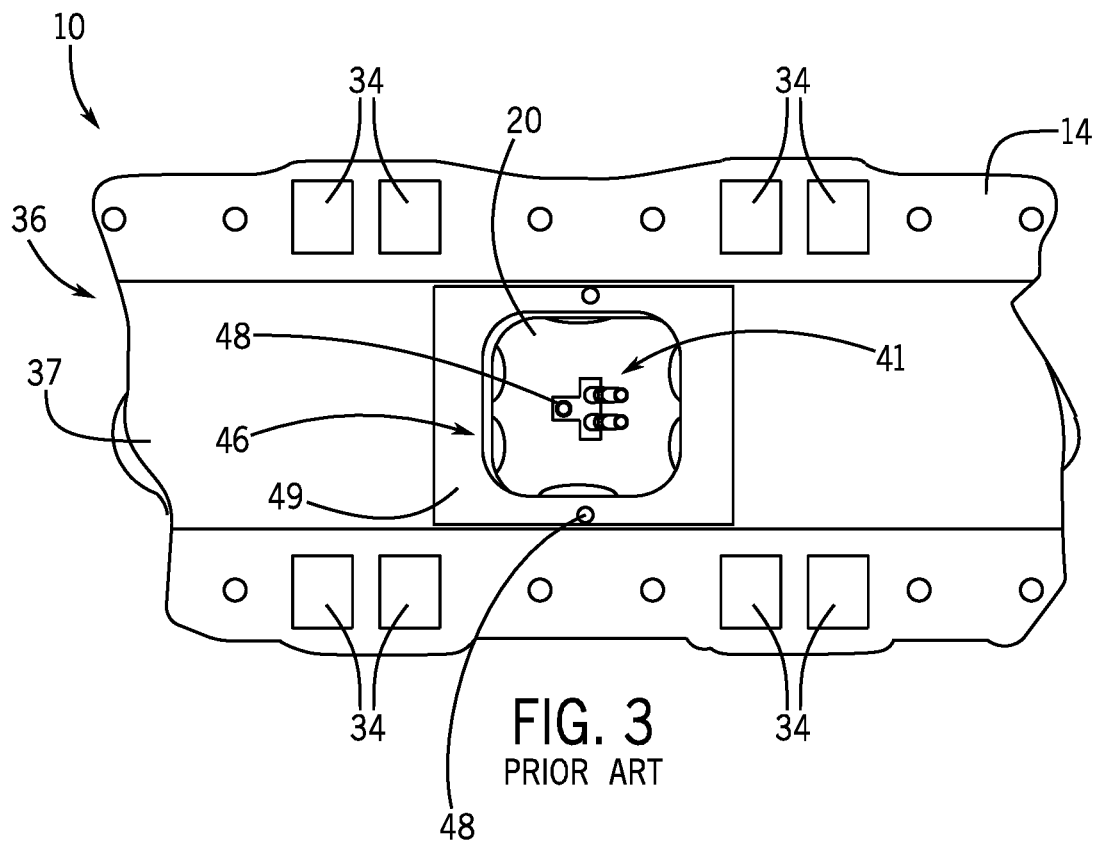
FIG. 3 is a bottom view of the intake manifold from FIG. 1, modified to install an aftermarket nitrous injector as known in the art.
Figure 2:
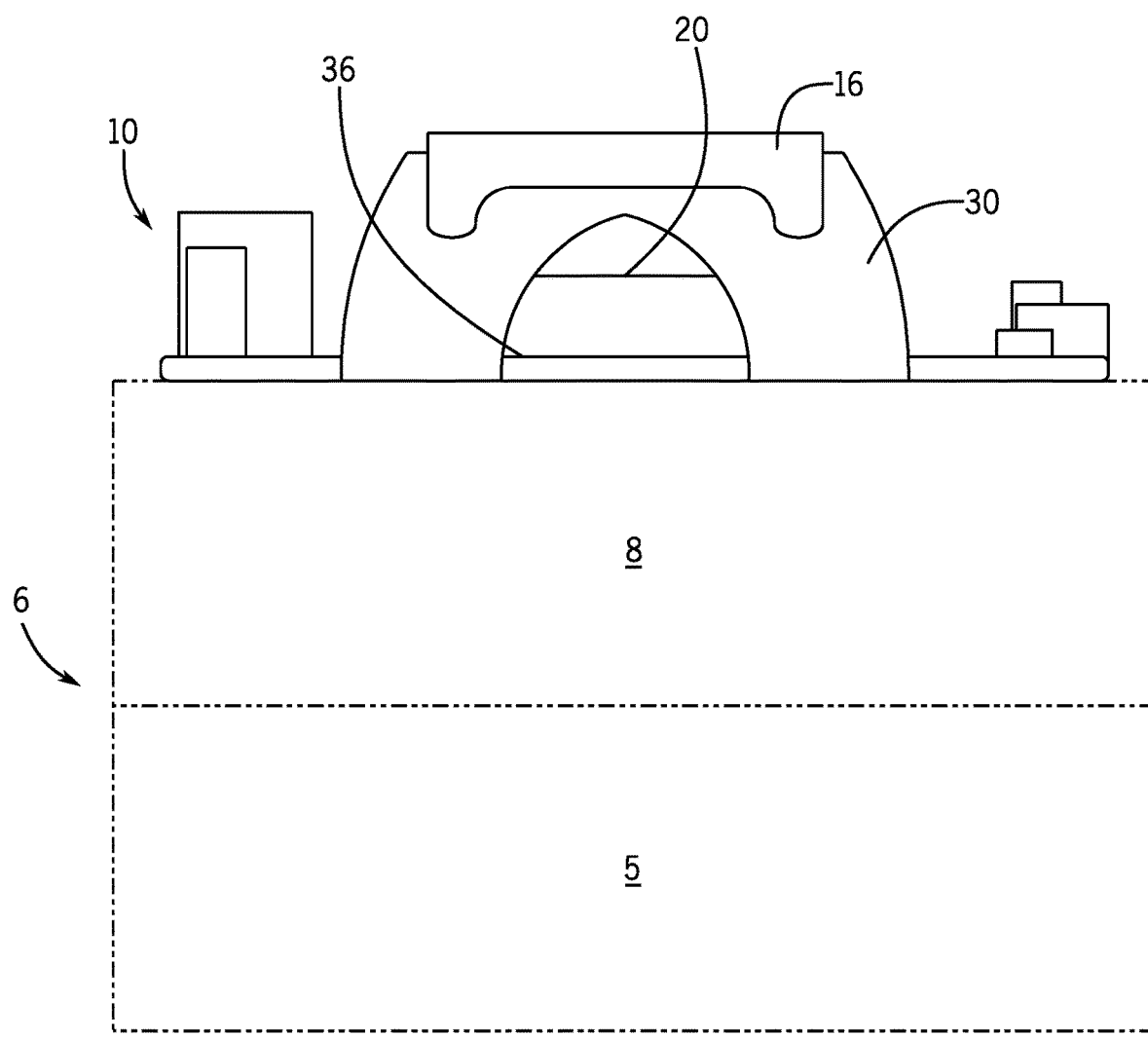
FIG. 2 is a side view of the intake manifold from FIG. 1 on a hidden engine.

As described in the Background, above, it is known for enthusiasts to install dry and wet versions of nitrous injectors to boost the performance of an engine. By way of additional background, the foregoing will generally be discussed within the context of intake manifolds 10 presently known in the art, which is shown in FIGS. 1-3. In the embodiment shown, a lower mount 36 of the intake manifold 10 has a top surface 12 and a bottom surface 14 and is coupled to the cylinder heads 8 in the customary manner. In certain embodiments, the lower mount 36 also incorporates a valley pan 37, though in other embodiments the valley pan 37 is a separate component. For the purpose of brevity, the disclosure will principally refer to the valley pan 37 as being integral with the lower mount 36.

The present inventor has identified shortcomings with the dry and wet versions of nitrous injectors known in the art, as well as both the plate type and direct port type of delivery methods thereby provided. Additional shortcomings arise with the use of intake manifolds 10 presently known in the art, which are exemplified in FIGS. 1 and 2. For example, while the plate type of nitrous injector is relatively inexpensive, its placement between the carburetor or throttle body (hereinafter, "throttle") and the upper mount 16 necessarily raises the throttle upward, often causing hood clearance issues as well as requiring modification to the throttle control linkage. Also, the plate type can deliver significantly uneven distribution of nitrous oxide to the cylinder heads 8 (see FIG. 3). While the direct port type of nitrous injector does not suffer from this hood clearance or throttle linkage issues, and has better cylinder distribution, its reliance upon providing individual nozzles for each of the cylinders requires special plumbing for each nozzle and requires a port to be drilled and thread tapped for each cylinder. This customized plumbing and tapping is very expensive, resulting in a cluttered setup with lines and hoses extending all over the engine 6.

Figure 14:
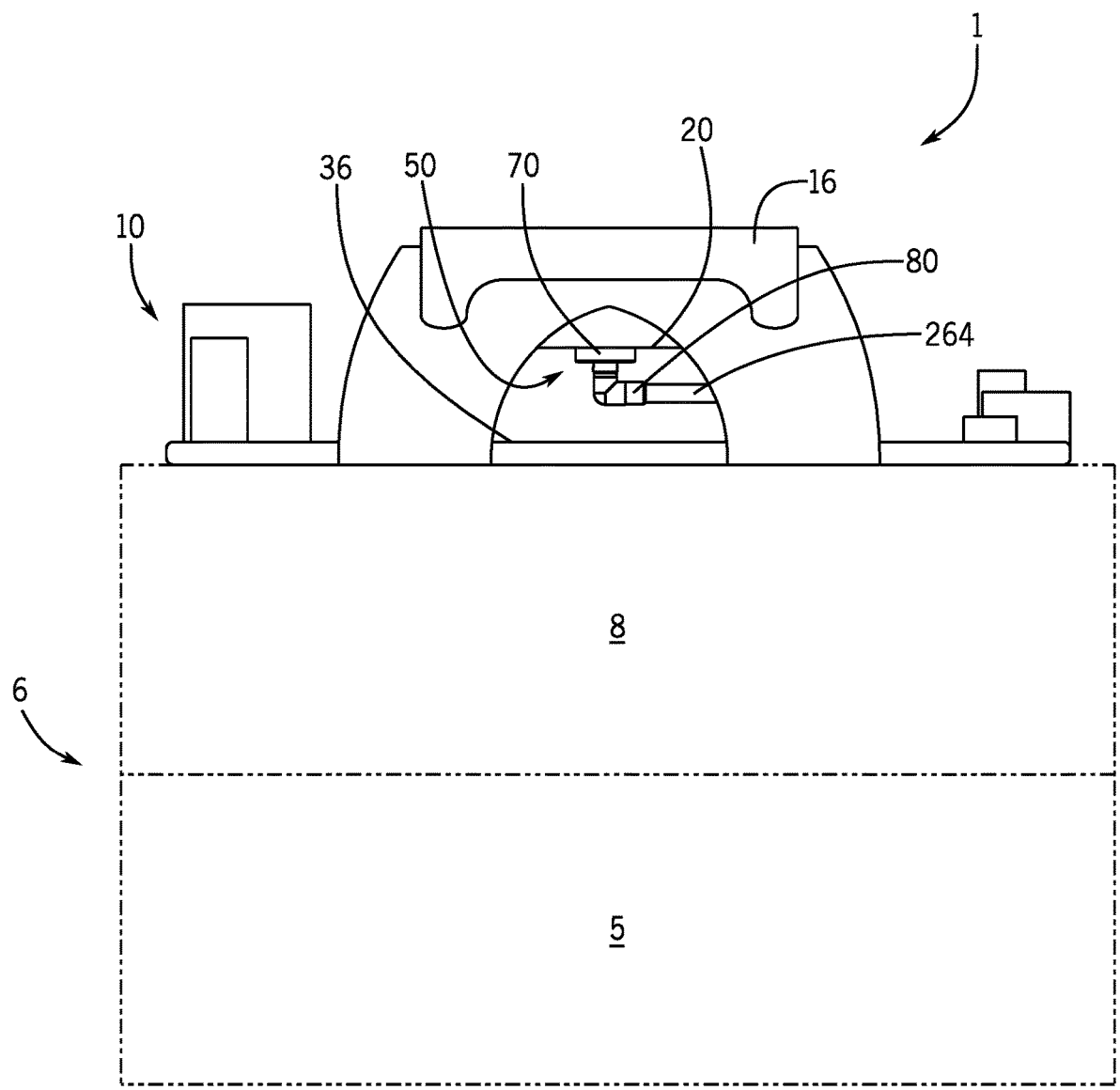
FIG. 14 is a side view of the intake manifold and dry injector system installed in FIG. 13.

One nitrous injector device sold in the market intends to overcome some of these shortcomings by installing the device directly in the plenum floor 20 of the intake manifold 10. This device is known as the nitrous "puck" and is available at http://www.nitrousoutlet.com/nitrous-puck. With reference to FIGS. 2 and 3, a nitrous input line 264 (see FIGS. 14 & 16) would be provided to the puck 40 via the space between the valley pan 37 (or lower mount 36, as discussed above) and the plenum floor 20. The puck 40 has internal openings to direct the flow of nitrous oxide from the nitrous input line 264 generally in the direction of the intake runners 30. This indirectly provides nitrous oxide to the cylinder heads 8 (via the intake openings 34 defined through the lower mount 36) without creating issues with hood clearance and throttle linkage or requiring special plumbing and threaded ports at each individual cylinder.

However, as shown in FIG. 3, the present inventor has identified that the puck 40 has its own list of shortcomings, including an extensive and expensive installation process. Moreover, the puck 40 poses a risk of causing severe damage to the engine 6 since any parts that loosen or break over time can fall into the engine 6 via the intake runners 30. Specifically, components that supply nitrous oxide to the nitrous puck 40 must be installed from the underside of the intake manifold 10, where they are coupled to the underside of the plenum floor 20. These components then supply the puck 40 portion, which is inserted from above the intake manifold 10 and bolted in from below the plenum floor. The portions of the puck 40 that are installed from below the plenum floor 20 are depicted as lower components 41 (i.e., fittings, hardware, and fasteners).

It should be recognized that the term "engine" 6 is frequently used throughout this disclosure to describe the intake manifold 10, cylinder heads 8, an engine block 5, and/or other related components customarily incorporated into engines known in the art. In other instances, "engine" 6 refers to the remaining components when described in conjunction with other elements that could be considered part of the engine 6. For example, reference is made to coupling the intake manifold 10 to the engine 6.

It should further be recognized that terms used herein are interchangeable between singular and plural form. For example, cylinder heads 8 includes systems having either a single or multiple cylinder heads, some engines may have multiple air inlet devices, and the like. Furthermore, "air inlet device" refers to anything that mounts to the upper mount 16, including a carburetor, throttle body, intake elbow, or other components known in the art. Moreover, while the present disclosure sometimes refers to fuel being present within the intake manifold or the incorporation of a throttle, for example, the presently disclosed systems and devices also anticipate incorporation with other types of engines 6 in which this is not the case (such as direct injection or diesel, for example).

In order to gain access to the plenum floor 20 to install these underside components from the bottom of the intake manifold 10, a large valley pan opening 46 must be cut into the metal of the valley pan 37 of the intake manifold 10. This hole must be large enough to pass these components through such that they can be installed in the plenum floor 20 and serviced from below. Cutting this large hole (which is typically square shaped) requires specialized equipment, precision, and necessarily adds significant expense to the installation of the nitrous injector.

Furthermore, the puck 40 requires installation of a cover 49 (shown here to be transparent) over the valley pan opening 46, which is bolted to the intake manifold 10 via threaded holes in the underside of the valley pan 37. In other words, additional fasteners 48 must be inserted from the bottom of the intake manifold 10 to retain this cover 49 in place. As such, these fasteners 48 are also at risk of falling, encouraged by gravity and engine 6 vibration, into the lifter valley/crankcase of the engine 6 over time. As would be apparent to one having ordinary skill in the art, these falling fasteners 48 (or the entire puck 40 and/or related parts) could cause catastrophic damage if they become loose and enter the engine 6 during operation. Likewise, the puck 40 requires a substantial amount of silicone (or some other sealant) to be applied to seal any gaps between the cover 49 and the valley pan 37, requiring further labor and materials. This silicone creates further risks of failure for reliance on the seal, and for the silicone itself getting into the engine 6 during operation.

The present inventor has further identified that simply obtaining the necessary access to install, remove, or otherwise service the puck 40 and other nitrous injectors known in the art is very laborious. Except for plate type nitrous injectors that can cause hood clearance issues, servicing many of these devices requires the intake manifold 10 to be entirely removed from the cylinder heads 8 to provide the necessary access to the components for the puck 40 from the bottom. This discourages changes to the setup, including optimizing the setup for different needs or situations.

Another (wet) injector known in the art is the Stealth Nozzle by Nightmare Motorsports. The present inventor has also identified significant issues with the Stealth Nozzle, which include the risk of parts falling into the engine 6 as previous discussed with respect to the puck 40. These fasteners should also be sealed individually to prevent vacuum leaks and the mounting pattern does not account for proper alignment with the intake ports. In other words, the Stealth Nozzle (as with other injectors known in the art) are capable of being installed in a manner such that the nitrous is not injected in proper alignment with the intake runners. Moreover, the Stealth Nozzle also suffers from the fact that it injects both high pressure nitrous and low pressure fuel via the same inlet line via the same, combined outlet ports. As a result, the high pressure nitrous effectively competes with the fuel entering the intake runners 30, thereby creating uncontrolled and performance-robbing (and potentially catastrophic) lean conditions. Furthermore, the Stealth Nozzle requires removing the intake manifold 10 for modification and installation, as previously discussed with respect to the puck 40.

Figure 4:
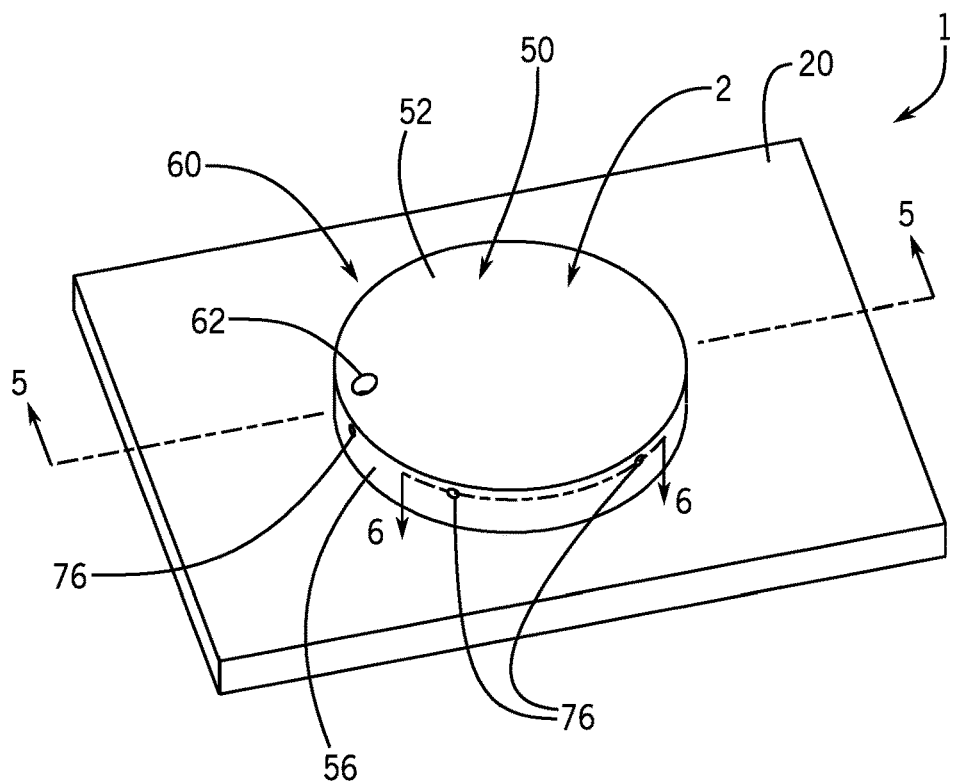
FIG. 4 is an isometric view of the top of one embodiment of a system including a first mountable device in accordance with the present disclosure, specifically, a dry injector.

FIG. 4 discloses one embodiment of a system 1 according to the present disclosure, which in this example depicts a dry injector 50 coupled to a portion of one embodiment of an intake manifold 10. As shown, the dry injector 50 is installed on the plenum floor 20 such that an upper portion 60 remains visible from above and a plurality of nitrous outlet ports 76 extend radially outwardly through a side wall 56. A plenum opening 24 in the plenum floor 20, along with a fixation feature 23 (shown here as a captured set screw engaging a blind hole in the plenum floor 20), rotationally fixes the dry injector 50 in place while it couples the dry injector 50 to the plenum floor 20. The fixation feature 23 is also referred to herein, alone or in conjunction with other features (such as threads within the plenum opening 24 or tabs 79/tab receivers 28 to be discussed below, for example) as a fixation system for aligning or maintaining the position of a mountable device 2 relative to the intake manifold 10. The nitrous outlet ports 76 are arranged such that nitrous oxide is injected from these nitrous outlet ports 76 directly into the intake runners 30 of the intake manifold 10 (shown in FIG. 1). Access to fix the dry injector 50 to the intake manifold 10 is provided entirely through the upper mount 16. Specifically, the dry injector 50 is fixed by a captured set screw 64 within the top 52, which in this case defines a fastener opening 62 to retain a captured set screw 64. In the embodiment shown, the fastener opening 62 is threaded from below such that the lower diameter 63b is threaded and larger than the non-threaded upper diameter 63a (shown in FIG. 5). By virtue of the captured set screw 64 being captured within the fastener opening 62, the dry injector 50 avoids the risk that the captured set screw 64 can fall into the engine 6, as previously discussed. It should be recognized that other forms of fasteners are also anticipated, including clamps and adhesives, for example.

Figure 5:
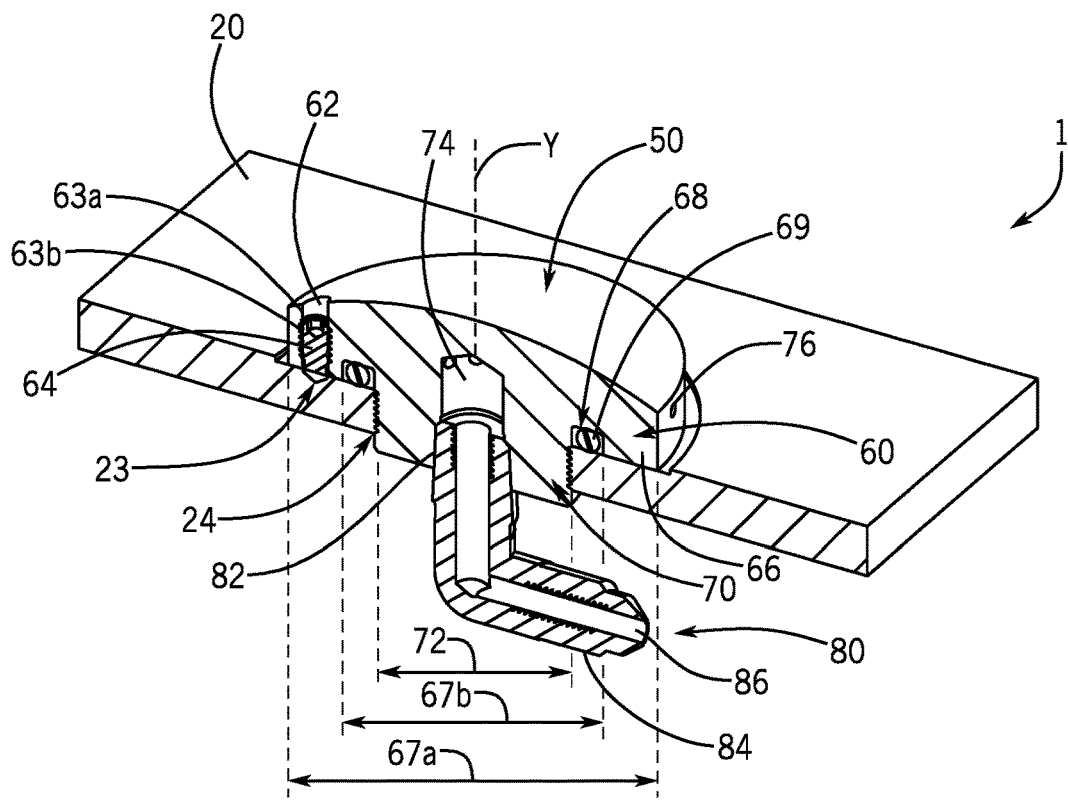
FIG. 5 is a sectional view taken along 5-5 in FIG. 4.

FIG. 5 shows a sectional view of the dry injector 50 from FIG. 4, showing the dry injector 50 coupled to the plenum floor 20. Specifically, the dry injector 50 is threaded onto the plenum floor 20 by engaging the threads along the outer perimeter of the lower portion 70 of the dry injector 50 with corresponding threads along the inner perimeter of the plenum opening 24. Other embodiments include ⅛ turn or tabbed arrangements between lower portion 70 and plenum opening 24, while others are retained merely by fit. In the embodiment shown, the dry injector 50 is threaded into the plenum opening 24 as far as possible and then backed off until the captured set screw 64 is aligned with the fixation feature 23 (shown here as a blind hole) in the plenum floor 20. Once aligned, the captured set screw 64 (or other fastener) is tightened such that the captured set screw 64 bottoms out in the fixation feature 23, maintaining the rotational alignment of the dry injector 50 relative to the plenum floor 20. In certain embodiments, the captured set screw 64 has a cylindrical shape where it engages the fixation feature 23 such that each contacts the other with a vertically oriented face, preventing upwardly-directed forces on the captured set screw 64. In addition to preventing the dry injector 50 from unscrewing from the plenum floor 20, the captured set screw 64 being engaged in the fixation feature 23 ensures that the nitrous outlet ports 76 are properly aligned to the intake runners 30, which is critical to overall system performance.

The embodiment of dry injector 50 shown has an upper portion 60 that remains above the plenum floor 20 and rests on the plenum floor 20 on a shelf 66 substantially near the outer diameter 67*a* of the lower portion 70 of the dry injector 50. A lower portion 70 of the dry injector 50 extends through a plenum opening 24 in the plenum floor 20. A gasket 69, shown here as an O-ring, is retained within a groove 68 in the dry injector 50 to provide a seal when the dry injector 50 is coupled to the plenum floor 20. The threads along the lower portion 70 of the dry injector 50 and along the plenum opening 24 are preferably very fine. Providing fine threads allow the dry injector 50 to be rotated without much corresponding vertical displacement. As such, the gasket 69 is able to retain a good seal between the dry injector 50 and the plenum floor 20 while still accommodating up to a full rotation of unscrewing the dry injector 50 to achieve alignment between the captured set screw 64 and the fixation feature 23 as described above. In certain embodiments, additional fixation features 23 are provided (for example, two fixation features 23 positioned 180 degrees apart) so that the captured set screw 64 can be aligned to one of the fixation features 23 with less rotation.

It should be known that in other embodiments, the threads along the lower portion 70 of the dry injector 50 and along the plenum opening 24 are configured such that the dry injector 50 is installed in less than a full rotation. For example, certain embodiments are configured such that the dry injector 50 is inserted into the plenum opening 24 and turned 45°, 90°, or some other portion of a full rotation to be fully seated (see, for example, FIGS. 17-22). As with the embodiments previously described, the gasket 69, if present, may be configured to create a seal between the dry injector 50 and the plenum floor 20 withstanding rotational adjustments to align the captured set screw 64 and the fixation feature 23. By configuring the dry injector 50 or other mountable devices 2 to be installed without requiring a full rotation, a greater variety of shapes and configurations of devices may be installed on the plenum floor 20 compared to those requiring full rotation to install. In particular, devices with shapes and sizes that would not otherwise have clearance to rotate (i.e., in view of the intake runner divider walls 32 shown in FIG. 1) can subsequently be installed.

Figure 20:
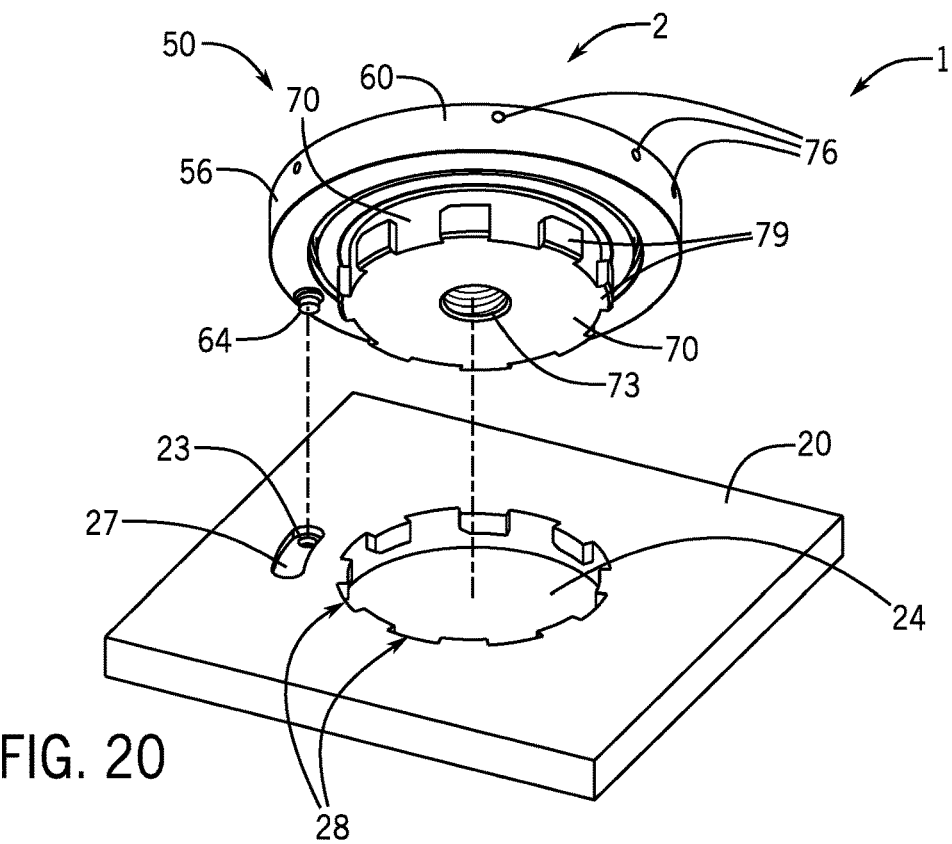
FIGS. 20-21 are isometric views of another embodiment of a system including another mountable device.
Figure 22:
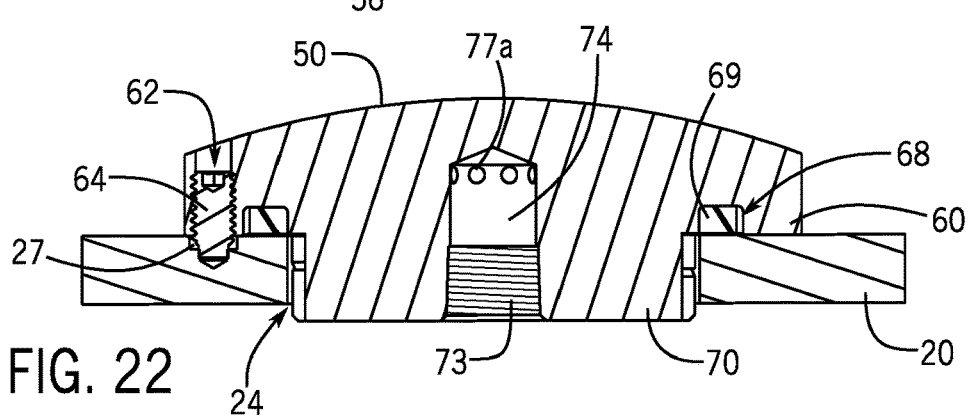
FIG. 22 is a sectional view taken along 22-22 in FIG. 21.

Returning to the embodiment shown in FIG. 5, a nitrous fitting 80 (which in the present example is threaded on upper portion 82 and receivable in receiver 73, shown in FIGS. 20 & 22) extends downwardly from the lower portion 70 of the dry injector 50 and provides a conduit for the nitrous inlet port 86 to supply nitrous oxide to the plurality of nitrous outlet ports 76 (shown in FIG. 4) via a nitrous chamber 74. In certain embodiments, the lower portion 84 of the nitrous fitting 80 is also threaded. In this regard, a nitrous input line 264 can be threaded onto the threads of the nitrous fitting 80 such that nitrous oxide can be delivered from the nitrous input line 264 through the nitrous inlet port 86, into the nitrous chamber 74, and out to the intake runners 30 through the nitrous outlet ports 76. This allows even dispersal of nitrous oxide into each cylinder through a single nitrous inlet line.

As shown in FIG. 5, the presently disclosed dry injector 50 does not require any vertical space above the upper mount 16, and therefore does not cause any hood clearance issues from raising the air inlet device. Likewise, the dry injector 50 provides targeted injection of nitrous oxide to each intake runner 30 via the plurality of nitrous outlet ports 76, without requiring special plumbing and drilling of threaded ports into each individual cylinder.

Furthermore, because the dry injector 50 is installed onto the plenum floor 20 from above, in this embodiment via a plenum opening 24 that is threaded, along with a captured set screw 64 that is retained within the dry injector 50, there is no risk for the captured set screw 64 to become dislodged and fall into the lifter valley or intake runners 30 during operation. As previously described, the present embodiment thereby prevents the substantial damage risks possible with devices known in the art. Moreover, the presently disclosed system 1 is configured such that even if the captured set screw 64 becomes disengaged from the fixation feature 23 (remaining captured in the fastener opening 62), the dry injector 50 remains seated with the lower portion 70 threaded into the plenum opening 24. Since the nitrous input line 264 is threaded onto the nitrous fitting 80 from below the plenum floor 20, this tethered connection helps prevent the dry injector 50 from unthreading out of the plenum opening 24. Furthermore, even if the dry injector 50 were to start to unthread from the plenum opening 24, the nitrous input line 264 would become taut, preventing the dry injector 50 from falling into the engine 6 through the intake runners 30. Accordingly, the presently disclosed systems 1 and methods are also safer alternatives to those devices known in the art.

It should be known that while certain examples throughout the application discuss advantages of the presently disclosed systems 1 and methods with respect to one type of injector or other mountable device 2 to be mounted to the plenum floor 20 (i.e., dry injectors 50), the systems and methods also apply to the other types of injectors and other devices discussed herein. In other words, the same benefits provided to dry injectors 50 apply to wet injectors 100, air flow devices 200, and other mountable devices 2 described below or otherwise anticipated herein.

The present inventor has identified that by the present system 1 including both a fixation feature 23 and a plenum opening 24 in the plenum floor 20 (initially plugged with a plug and gasket, which while not expressly shown would resemble a dry injector 50 without nitrous outlet ports 76), a stock intake manifold 10 may be configured to later add a dry injector 50, wet injector 100, or another mountable device 2 to the intake manifold 10 without requiring modification of the plenum floor 20, or even removing the intake manifold 10 from the engine 6. In this regard, a dry injector 50 or other mountable device 2 may be later added to the presently disclosed intake manifold 10 by simply removing the plug and installing the dry injector 50 or other mountable device 2 from above. As would be recognized by one having ordinary skill in the art, the presently disclosed system 1 thus allows the addition, removal, or modification of mountable devices mounted in the intake manifold 10 simply by removing the air inlet device, which provides access through the upper mount 16 to the plenum floor 20 from above.

Figure 6:
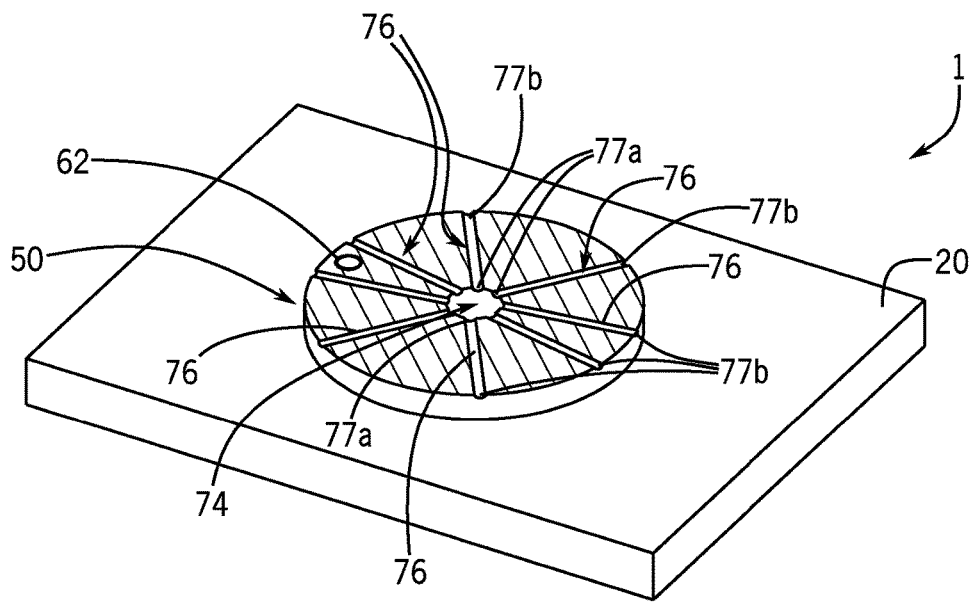
FIG. 6 is a sectional view taken along 6-6 in FIG. 4.

FIG. 6 shows a sectional view of the dry injector 50 taken along 6-6 in FIG. 4. The embodiment of the dry injector 50 presently shown is designed for a cylinder head 8 having eight cylinders, as evidenced by the presence of eight individual nitrous outlet ports 76, one corresponding to each cylinder. In the same regard, the corresponding intake manifold 10 of this system 1 would also be designed for cylinder heads 8 for eight cylinders. Each nitrous outlet port 76 has an inner end 77a in communication with the nitrous chamber 74, which extends to an outer end 77b through the side wall 56 of the dry injector 50 to inject the nitrous oxide in the direction of each cylinder in the cylinder heads 8. The captured set screw 64 can also be seen, which in this embodiment is a hex-headed set screw.

It should be noted that the term cylinder heads 8 also describes embodiments having two or more separate portions (i.e., systems having two cylinder heads 8 that each correspond to four cylinders in the engine block 5, in the case of a V8).

Figure 7:
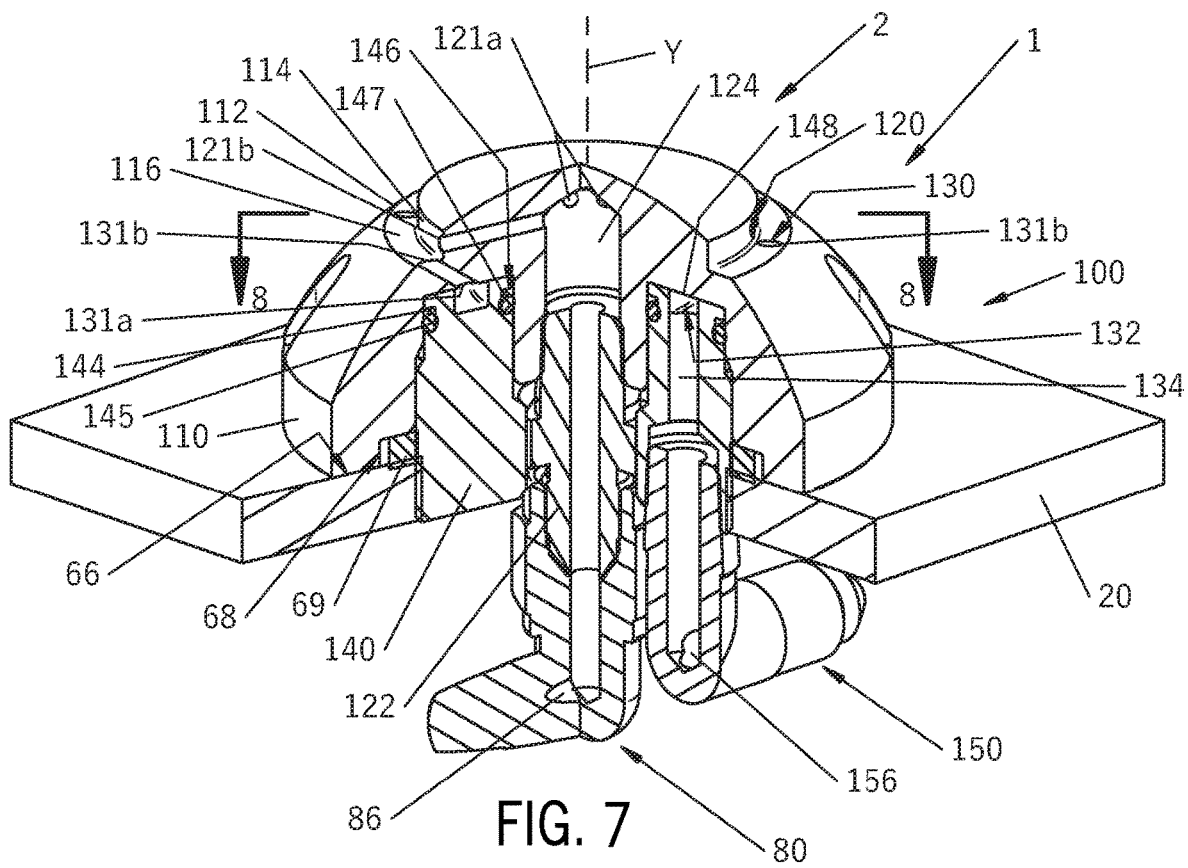
FIG. 7 is an isometric, sectional view of another embodiment of a system that includes another mountable device in accordance with the present disclosure, specifically, a wet injector.
Figure 8:
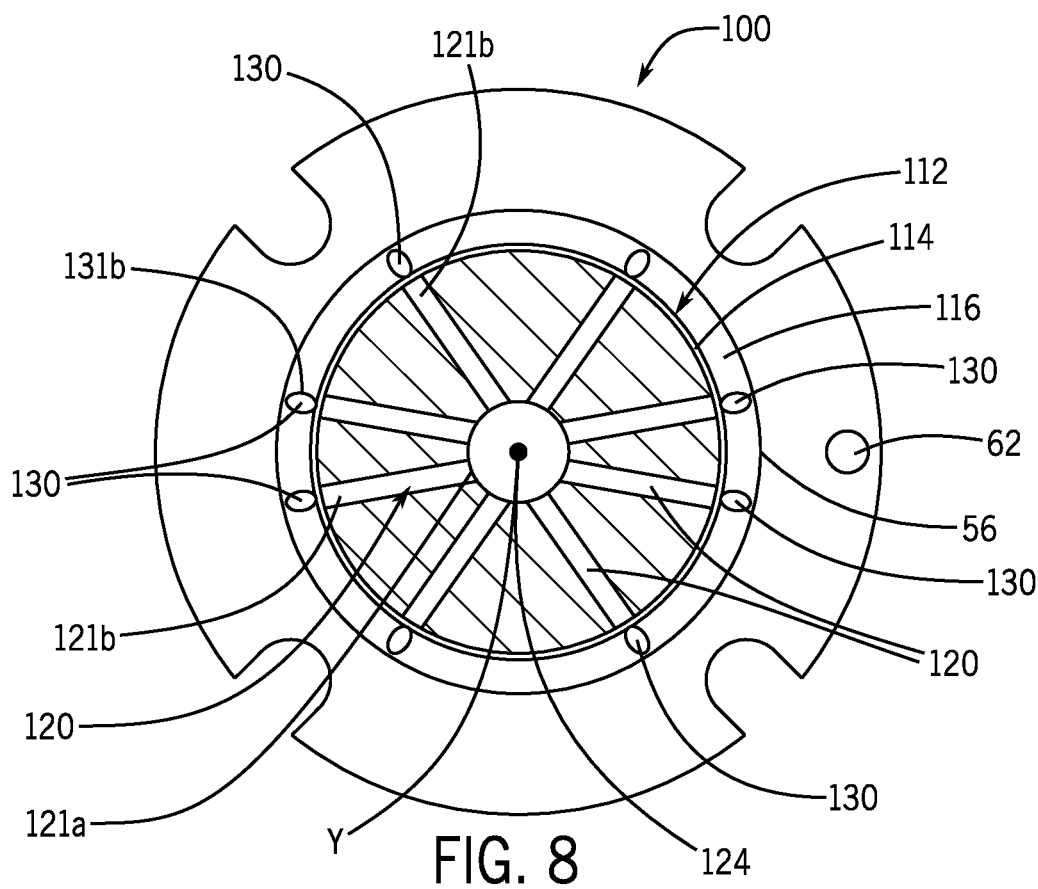
FIG. 8 is top, sectional view taken along 8-8 in FIG. 7.

FIGS. 7-8 show one embodiment of a system 1 having a wet injector 100 mounted on an intake manifold 10 in accordance with the present disclosure. The wet injector 100 is installed on the plenum floor 20 in the same manner as previously described with the dry injector 50. Specifically, a captured set screw 64 accessible through a fastener opening 62 (i.e., threaded from the bottom) in the upper portion 60 of the wet injector 100 is received in a fixation feature 23 in the plenum floor 20 to align the wet injector 100 to the intake runners 30, and to prevent it from unthreading from the plenum floor 20. In the embodiment shown, the nitrous fitting 80 extends from substantially the axial center Y of the wet injector 100 in a similar manner as previously described with the dry injector 50. This provides communication between a nitrous inlet port 86 below the plenum floor 20 and the nitrous chamber 124 that leads to the nitrous outlet ports 120 in the upper portion 60 of the wet injector 100. In certain embodiments, such as that shown in FIG. 7, a nitrous inlet adaptor 122 is provided so a swivel joint such as the nitrous fitting 80 can be tightened without interfering with the fuel fitting 150 (by virtue of the nitrous fitting 80 being angled, shown here to be 90-degrees).

The upper portion 110 and lower portion 140 of the wet injector 100, and various pathways defined therein, are defined through use of an upper outside gasket 145 within an upper outside groove 144, and an upper inside gasket 147 within an upper inside groove 146, which act as seals.

In addition, the present embodiment, being a wet injector 100, includes the addition of a fuel fitting 150 for providing additional fuel to be injected into the cylinders in conjunction with the nitrous oxide. In the embodiment shown, the fuel fitting 150 is provided within the wet injector 100 off-centered. Fuel is provided at the fuel fitting 150 through a fuel inlet port 156 defined therein, up to a fuel chamber 134, and extending then through a radial fuel channel 132 near the perimeter of the side wall 56 in the upper portion 110 of the wet injector 100. The channel 132 is defined in part by an interior shelf 148 in which the upper portion 60 can rest upon the lower portion 140. As shown in FIG. 7, the fuel channel 132 constitutes a series of fuel outlet ports 130 having inner ends 131a that communicate with the fuel chamber 134 and that extend upwardly and outwardly to outer ends 131b, which in certain embodiments are configured like the inner ends 77a and outer ends 77b of the nitrous outlet ports 76 shown in FIG. 6, but are not parallel to the horizontal plane of the plenum floor 20. The outer ends 131b extend through the surface of the wet injector 100 such that the fuel outlet ports 130 are near the nitrous outlet ports 120. In certain embodiments, a fixation feature may be used to lock the upper portion 110 to the lower portion 140 by preventing rotation after they are assembled together before they are to be installed in the intake manifold 10.

Returning to FIGS. 7-8, the present inventor has configured the fuel injection in the embodiment shown to provide optimal fuel atomization. In the embodiment shown, the nitrous outlet ports 120 are horizontal and the fuel enters the pathway of the nitrous outlet ports 120 from underneath at an upward angle via fuel outlet ports 130. This configuration allows lower pressure fuel to be injected from the fuel outlet ports 130, which then enters the path of higher pressure nitrous oxide being injected from the nitrous outlet ports 120. The resulting distribution of the fuel is therefore faster, and better atomized, than with systems that provide fuel on a separate path.

In the embodiment shown, the nitrous outlet ports 120 (which in this case are effectively the same as the nitrous outlet ports 76 previously described) and the fuel outlet ports 130 are defined within a distribution ledge 112 within the side wall 56 of the wet injector 100. The distribution ledge 112 includes a vertical face 114 and a horizontal face 116, which in the present case are substantially perpendicular to each other. However, it should be recognized that other embodiments are anticipated in which the vertical face 114 and the horizontal face 116 are other than vertical and horizontal, respectively, and/or are not perpendicular to each other. As shown, the nitrous outlet ports 120 have inner ends 121a opposite outer ends 121b that are defined within the vertical face 114. Fuel outlet ports 130 are defined within the horizontal face 116. In this regard, when nitrous oxide and fuel are injected from the respective ports, the nitrous oxide and fuel intersect and are mixed into a combined stream as they're injected into the intake runners 30.

It should be recognized that while the vertical face 114 and horizontal face 116 are presently shown to be substantially perpendicular and parallel to the plenum floor 20, the nitrous outlet ports 120 and/or the fuel outlet ports 130 may be defined within the vertical face 114 and horizontal face 116, respectively, such that nitrous oxide and/or fuel are injected in a perpendicular, or non perpendicular direction relative to the corresponding face within the distribution ledge 112. In this manner, while the nitrous oxide and fuel injected from the nitrous outlet ports 120 and fuel outlet ports 130 are mixed, they need not meet perpendicularly. Moreover, the nitrous outlet ports 120 and/or fuel outlet ports 130 may be shaped or sized to optimize the volume or flow direction of injection therefrom, including optimizing the balance between nitrous oxide and fuel for a given wet injector 100.

Figure 32A:
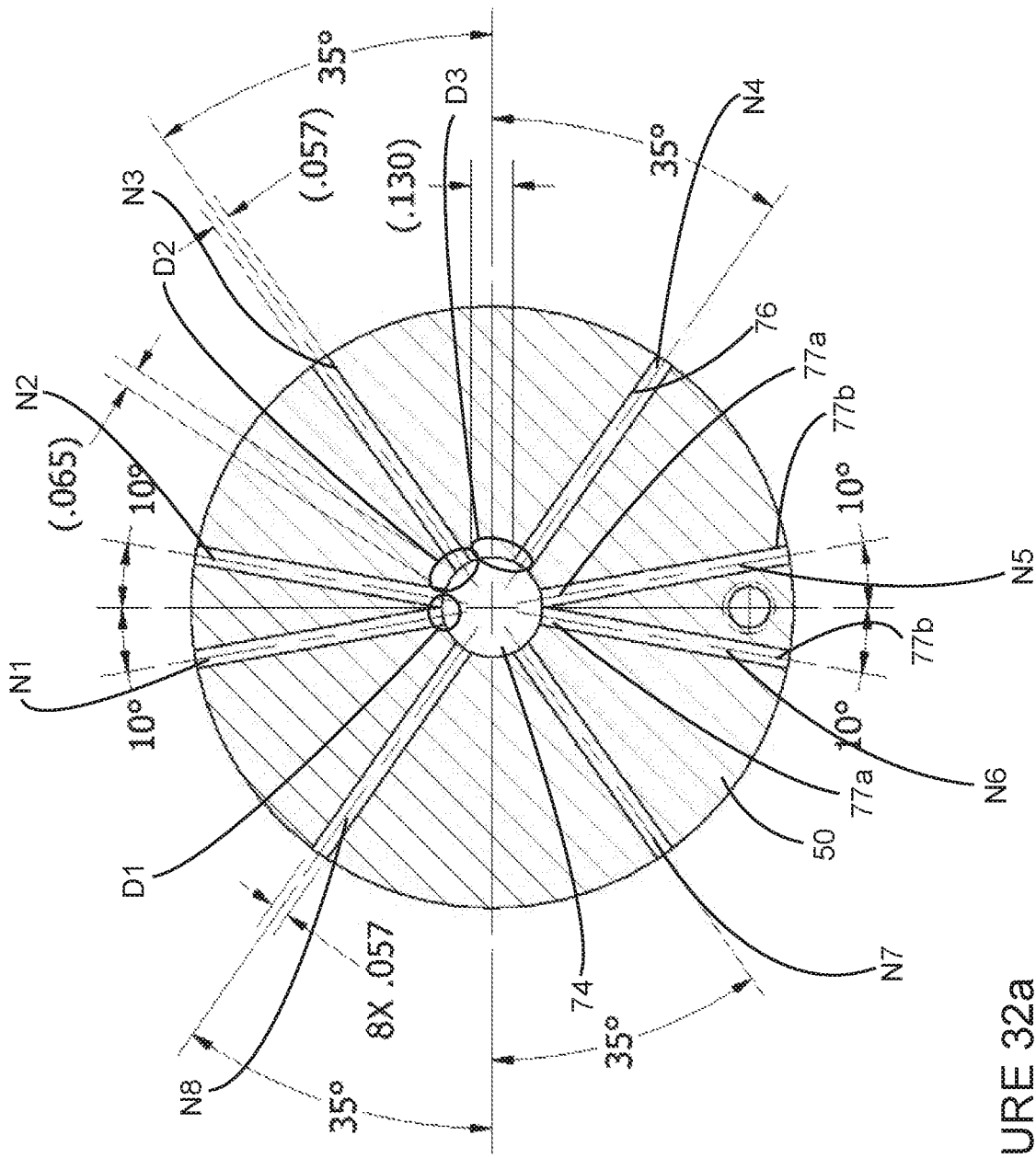
FIGS. 32a and 32b depict alternate configurations of nitrous outlet ports within one mountable device configured to be incorporated into embodiments of the presently disclosed systems.
Figure 32B:
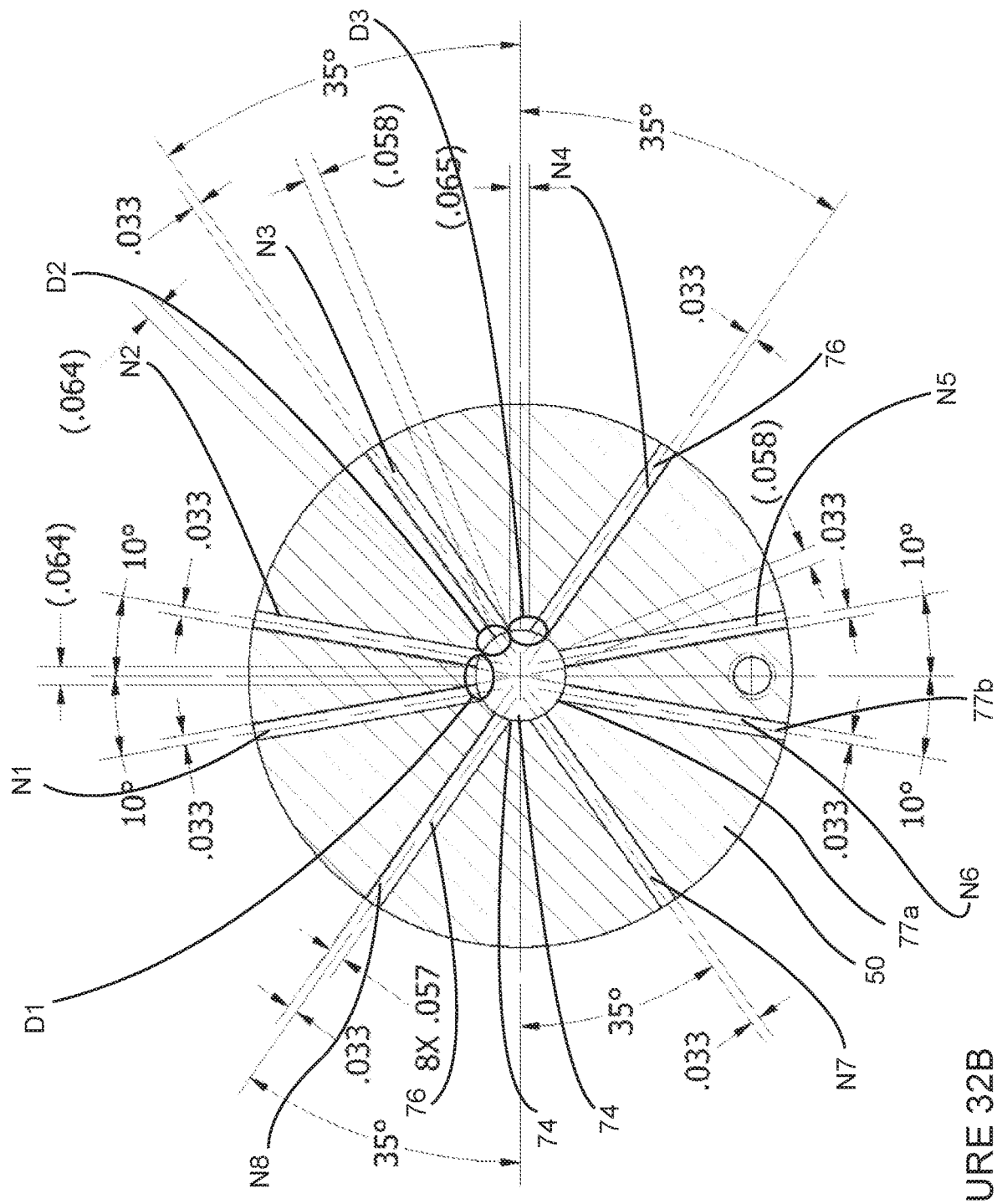

As shown in FIGS. 32a and 32b, the present disclosure further anticipates different configurations for defining the nitrous outlet ports 76 within a dry injector 50, the nitrous outlet ports 120 and/or fuel outlet ports 130 within a wet injector 100, or the nitrous outlet ports 120 and/or fuel outlet ports 130 within other mountable devices anticipated by the present disclosure to optimize performance and even distribution of nitrous oxide and/or fuel. In the exemplarily dry injector 50 shown in FIG. 32a, the nitrous outlet ports 76 (labelled as N1-N8) are defined such that the outer ends 77b are substantially aligned with the intake runners 30 of the intake manifold 10 as previously described. In this embodiment, each of the nitrous outlet ports 76 (N1-N8) are defined perpendicularly to the side wall 56 of the dry injector 50. In other words, each of the nitrous outlet ports 76 is defined between the point on the parameter of the dry injector 50 that is aligned to the intake runner 30, and the radial center of the dry injector 50.

Through experimentation and development, the present inventor has identified that, in certain cases, this configuration leads to an uneven distribution of nitrous oxide injected from each of the nitrous outlet ports 76. In particular, this configuration provides that the inner ends 77a of the nitrous outlet port 76 are closer between some adjacent nitrous outlet ports 76 than other. For example, the distance D1 between nitrous outlet ports N1 and N2 is different than the distance D2 between nitrous outlet ports N2 and N3, which is different from the distance D3 between nitrous outlet ports an N3 and N4. In use, the flow of nitrous oxide from the nitrous chamber 74 to the nitrous outlet ports N1 and N2 may in some cases end up effectively sharing a flow of nitrous oxide, or in other words starving each other, relative to other nitrous outlet ports 76, such as nitrous outlet port N4.

Accordingly, the present inventor has developed further embodiments of dry injectors 50 providing a uniform distance between all nitrous outlet ports 76, thereby providing even distribution of nitrous oxide from the nitrous chamber 74. As shown in FIG. 32b, the distance D1 between nitrous outlet ports N1 and N2 is substantially equal to the distance D2 between nitrous outlet ports N2 and N3, which is substantially equal to the distance D3 between nitrous outlet ports N3 and N4. While the present inventor has identified that even separation between adjacent nitrous outlet ports 76, and particularly their respective inner ends 77a, in certain embodiments provides for improved distribution of nitrous oxide distributed thereto, the respective outer end 77b of the nitrous outlet ports 76 nonetheless remain aligned with the corresponding intake runners 30 to provide the nitrous oxide in the manner previously described. In certain embodiments, this is provided by offsetting each nitrous outlet port 76 from center by an equal amount, which ensures that the inner ends 77a have the same entrance area for receiving nitrous oxide from the nitrous chamber 74.

It should be recognized that while the particular angles and configurations for the nitrous outlet ports N1-N8 are provided, these merely depict one possible configuration anticipated by the present disclosure. In other words, while the embodiment of FIG. 32b principally demonstrates a translational shift of nitrous outlet ports 76 relative to the embodiment shown in FIG. 32a, this alteration may further include changes to the angle between adjacent outlet ports 76 as required to optimize the point in which the nitrous oxide is injected form each of the nitrous outlet ports 76 to its corresponding intake runner 30.

The present inventor further anticipates alternative solutions for further optimizing even distribution among the nitrous outlet ports 76, including different shapes and/or diameters for some of the nitrous outlet ports 76 versus others based on differences to neighboring nitrous outlet ports 76 and other variables impacting the pressure or volume of nitrous oxide provided to the nitrous outlet port 76 from the nitrous chamber 74.

It should further be recognized that, while the foregoing was described principally in view of an exemplary dry injector 50, the same optimization for configuring fuel outlet ports 130 is anticipated by the present disclosure, as is the optimization of nitrous outlet ports 120 within a wet injector.

The present inventor has further identified that by providing a plenum opening 24 within the plenum floor 20 of an intake manifold 10, other mountable devices 2 may also be installed within the intake manifold 10 to improve the performance or otherwise modify the operating characteristics of the engine 6. These may include other shapes and configurations of dry injectors 50 or wet injectors 100, or may improve performance through other techniques. For example, the presently disclosed system 1 enables modifying the flow of air into the intake runners 30, either alone or in combination with nitrous oxide and/or fuel injection. Although some of these mountable devices to be installed in the plenum floor 20 are not sensitive to rotational alignment (i.e., a symmetrical cone shaped device as shown in FIG. 9a), the further use of the captured set screw 64 as previously discussed once again prevents such devices from decoupling from the plenum floor 20 over time.

It should also be recognized that mountable devices 2 also include blank covers (not shown) that simply block the plenum opening 24 without other impact on the performance of the engine 6. In certain embodiments, such a blank cover resembles the intermediate adaptor 300 previously described. The present inventor has identified that manufacturers of the presently disclosed intake manifolds 10 (and systems 1 more generally) may sell the intake manifolds 10 with a blank cover in place over the plenum opening 24, whereby the user may then remove the blank cover to replace with another mountable device 2 of their choosing at a later date. As with the other mountable devices 2 described herein, the presently disclosed system permits the blank cover to be mounted and dismounted without requiring removal of the intake manifold 10 from the engine 6.

Figures 9A, 9B:
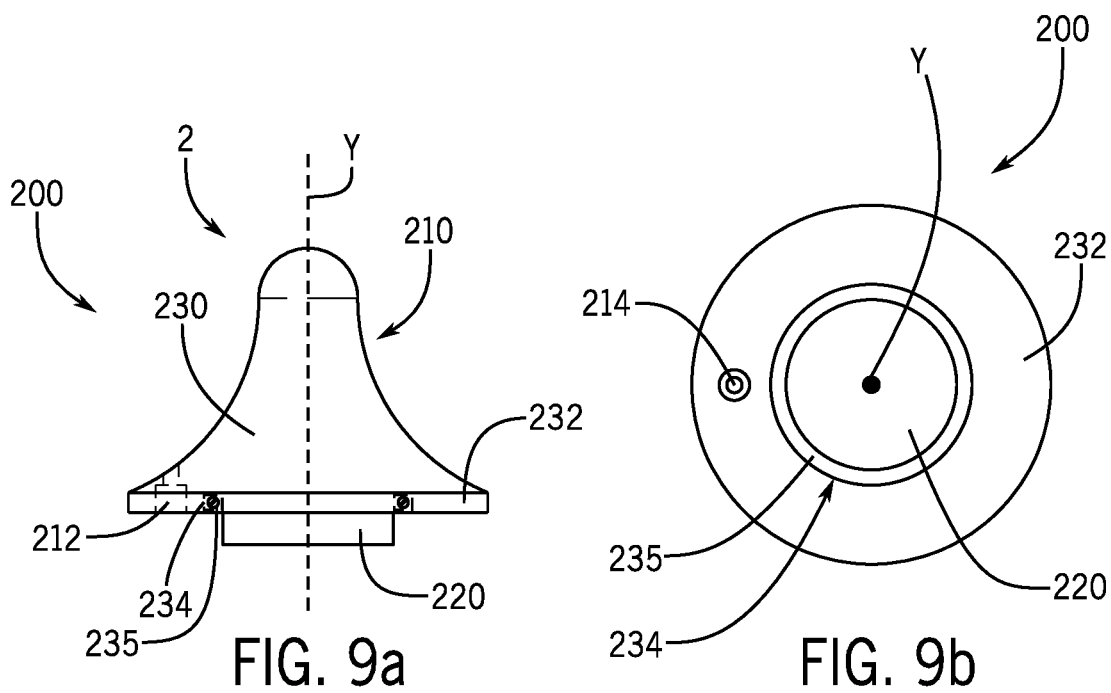

FIGS. 9a and 9b depict an exemplary airflow device 200 having an upper portion 210 extending upwardly from a base 232 and a lower portion 220 below. In this embodiment, the lower portion 220 helps to plug the plenum opening 24 and to assist in transversely immobilizing the air flow device 200 upon installation. The airflow device 200, shown here to have a contoured surface 230, is installed in the plenum floor 20 of the intake manifold 10 in the same manner previously described, through use of a captured set screw 214 in the fastener opening 212 of the upper portion 210 that allows the airflow device 200 to be rotatably fixed to the plenum floor 20 from above. The contoured surface 230 and overall conical shape helps to smooth the airflow into the intake runners 30. The presently disclosed systems 1 allow a user to optimize this airflow by installing the airflow device 200 from above by simply removing the air inlet device without removing the intake manifold 10, as previously discussed.

As described above, a gasket 235 and corresponding groove 234 to retain the gasket 235 are again incorporated between the airflow device 200 and the plenum floor 20.

While the gasket 235 is not required, certain embodiments benefit from the gasket 235 creating a seal between the airflow device 200 and the plenum floor 20. In other embodiments, the base 232 of the airflow device 200 or other mountable device 2 is made of a material that provides the same sealing functionality without a separate gasket.

Other air flow devices are known in the art, such as those available at http://brodix.com/parts/turtles-and-super-turtles-manifold-inserts. These devices are not configured for a simple and safe installation into any systems having mounting features within the plenum floor 20, such as those presently disclosed. Instead, these aftermarket devices are simply glued in place on the plenum floor 20. By being glued in place, there is a risk of these devices becoming dislodged over time, falling into an intake runner 30, and causing engine 6 damage as previously described. Likewise, because there are no corresponding mounting features on the plenum floor 20, such as a plenum opening 24 and/or fixation feature 23 as presently disclosed, there is no mechanism for ensuring that these aftermarket devices have been glued in the optimal location. Moreover, since these devices typically require epoxying (if not tapping and/or cutting), they require substantial processing and drying time. This also precludes the option of swapping components in and out for tuning purposes with an assembled engine 6, which are made easy through the systems 1 of the present disclosure.

Figure 10A:
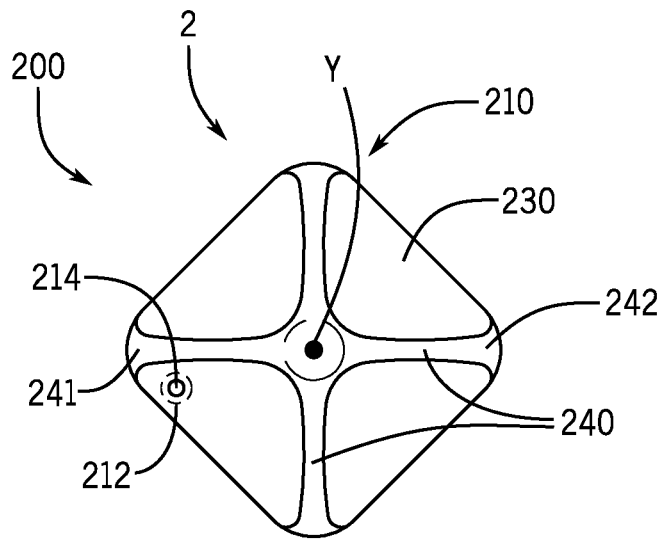
FIG. 10a is a top view of another embodiment of a system that includes another mountable device in accordance with the present disclosure, specifically, an air directing device.
Figure 11A:
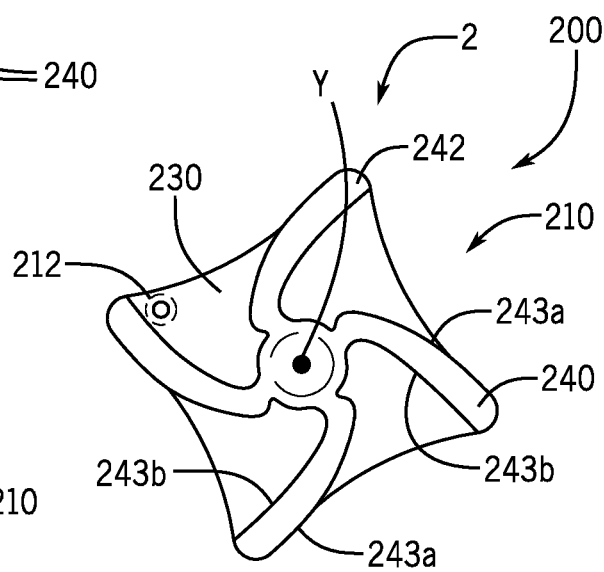
FIG. 11a is a top view of an air directing and swirl device.
Figure 10B:
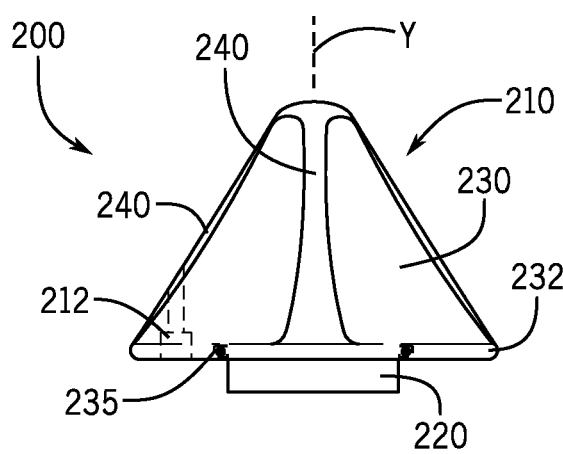
Figure 11B:
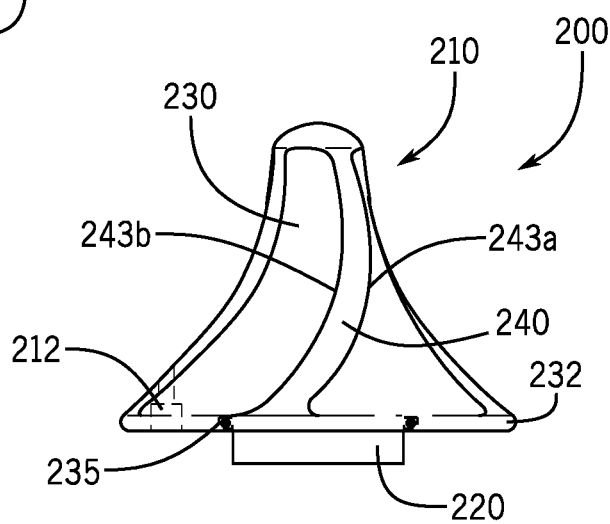

FIGS. 10a and 10b depict another mountable device 2 for integration into the presently disclosed systems 1, this time an air flow device 200 described as an air directing device. The air flow device 200 further defines the direction of flow through the addition of fins 240. Likewise, FIGS. 11a and 11b depict an air directing and swirl device as the air flow device 200, which is similar to that shown in FIGS. 10a and 10b, but whereby each fin 240 is curved as it extends between a center Y and a tip 242 with a leading edge 243a and a trailing edge 243b. This design induces swirl in the airflow, further assisting in combustion. It should be recognized that the size or contour of each fin 240 may vary depending on the particular intake manifold 10, engine 6, or desired characteristics of airflow or velocity. In one embodiment, the air directing and swirl device extends upwardly to be approximately half the height of the intake cavity 25 (FIG. 1). The fins 240 may also be supported with reinforcements 241 for additional rigidity.

Figure 12A:
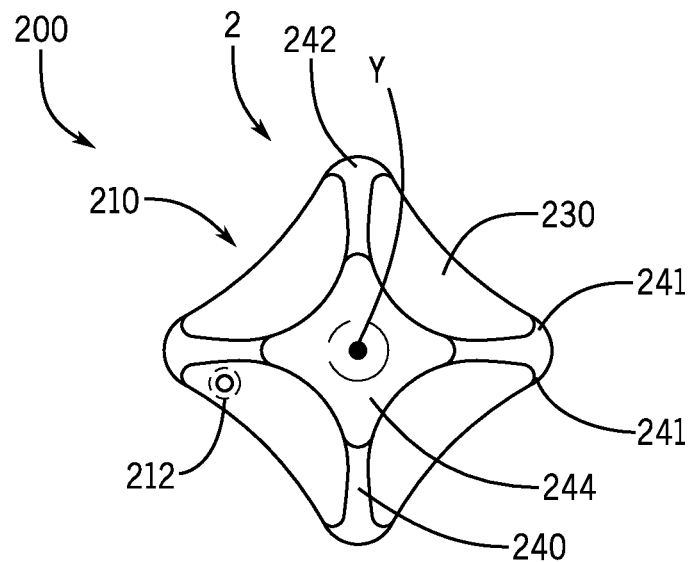
FIG. 12a is a top view of an air directing device with carb signal booster in accordance with the present disclosure.
Figure 12B:
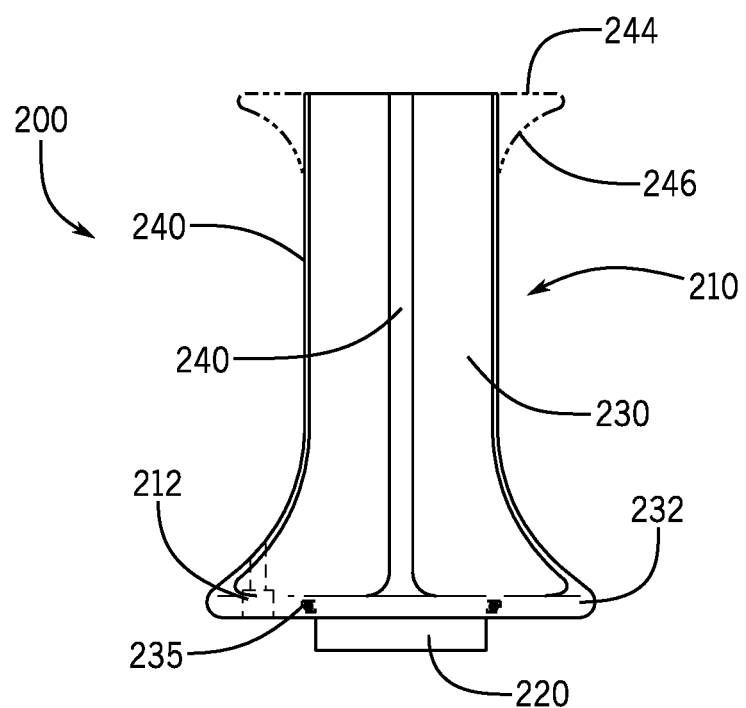

FIGS. 12a and 12b depict yet another airflow device 200, this time an air directing device providing a carburetor signal booster. Specifically, unlike the air flow device 200 shown in FIGS. 10a and 10b, the present device extends upwardly to be flush with the upper mounting 16 to the base of the throttle blades. This helps to improve airflow velocity near the carburetor venturi. The upper plateau 244 shown in the Figures may optionally have an upper contour 246 that curves outwardly to further match the carburetor throttle butterflies for further tuning and optimization.

It should be recognized that even for mountable devices 2 that do not inject nitrous oxide (with or without fuel), the presently disclosed system 1 ensures proper alignment of the mountable device 2 within the intake manifold. For example, for the embodiments shown in FIGS. 10a-12b, the alignment of the captured set screw 214 with the fixation feature 23 in the plenum floor 20 ensures that the fins 240 are properly aligned to the intake runners 30 and divider walls 32. Without this alignment feature, the benefits of these mountable devices 2 may not be realized, or the mountable device 2 may even have a detrimental impact on performance.

The present inventor has further recognized that the devices shown in FIGS. 9a-12b, as well as other mountable devices 2 compatible with the presently disclosed system 1, can also be designed to change the volume as yet another tuning tool. Specifically, this is modified by selection of the mountable device 2 installed on the plenum floor 20, particularly its corresponding volume. In this regard, the plenum volume can be easily tuned through the disclosed systems 1 and methods to tune the engine for optimum RPM or efficiency at different RPMs.

As previously described, mountable devices 2 may also be combined with each other and/or with a wet injector 100 or dry injector 50 for further optimization effects. For example, an airflow device 200 such as those shown in FIGS. 9a-12b can also be configured to inject nitrous oxide or nitrous oxide and fuel, as previously described. Similarly, while the dry injectors 50 and wet injectors 100 previously described were shown to have small profiles and volumes to effectively remain out of the way, either device could be reshaped to modify the air flow towards the intake runners 30 for further optimization.

Figure 13:
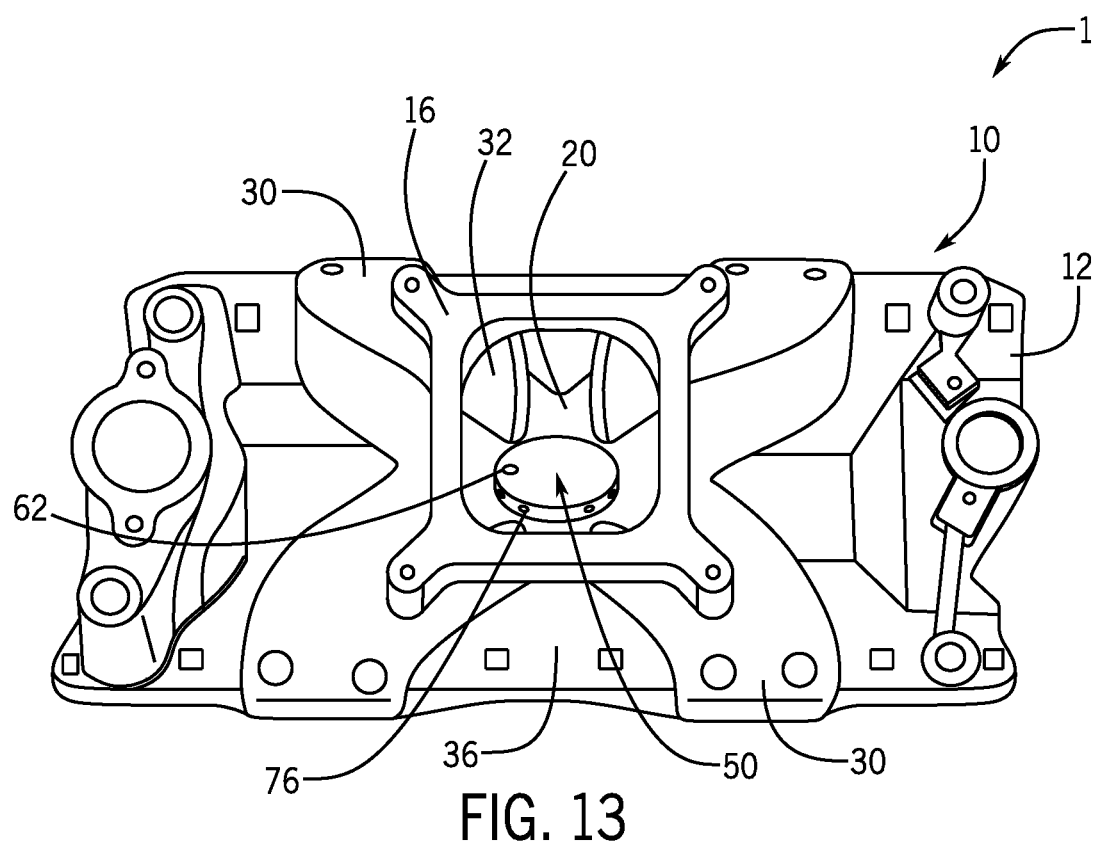
FIG. 13 depicts one embodiment of a system including an intake manifold with a dry injector incorporated therein in accordance with the present disclosure.
Figure 15:
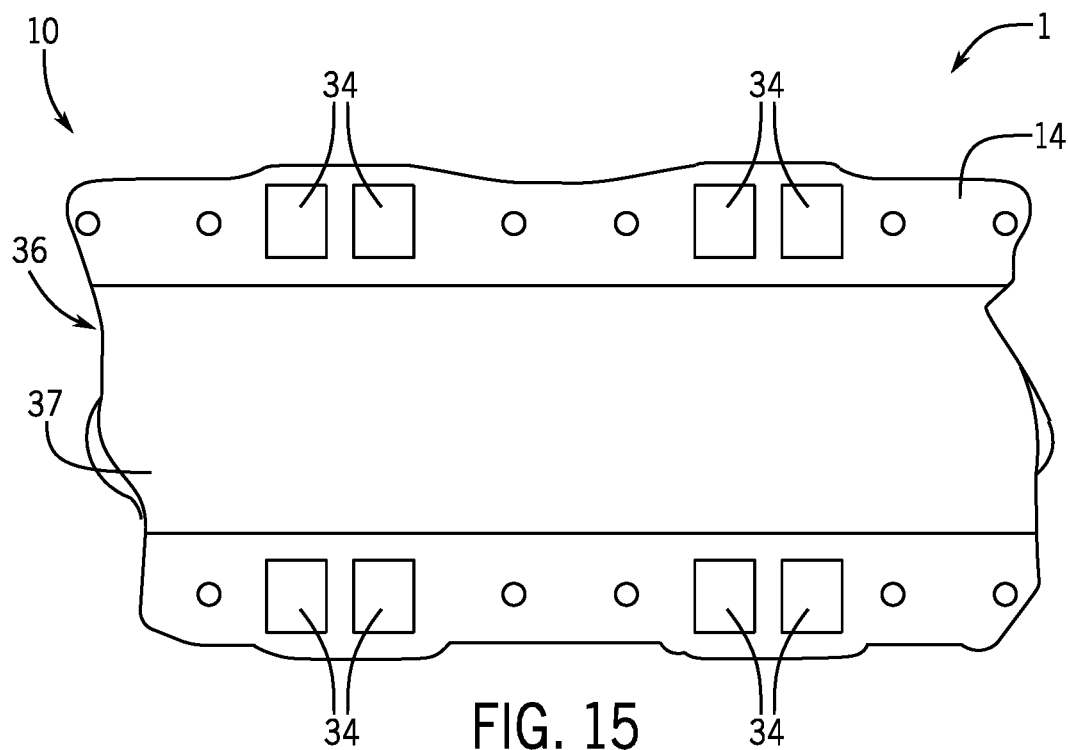
FIG. 15 is a bottom view of the intake manifold and dry injector system installed in FIG. 13.

FIG. 13 depicts an intake manifold 20 with one embodiment of a dry injector 50 installed in accordance with the present disclosure, specifically one having a low profile. Similarly, FIG. 14 discloses the installation of this dry injector 50 from above and extending through an opening in the plenum floor 20, which does not require any modification to the valley pan 37, shown to be intact. Since the valley pan 37 remains intact (see FIG. 15), and because the dry injector 50 has a captured set screw 64, no parts can fall into the intake runners 30 or lifter valley, which remains protected by the valley pan 37. As shown, the nitrous input line 264 and, in the case of a wet injector 100 the fuel input line (not shown), can simply be run through the space between the plenum floor 20 and the valley pan 37.

In contrast, FIGS. 25-28 depict another embodiment of a dry injector 500, but this time being configured to also provide the airflow optimization of airflow devices 200 previously discussed. As seen in Figs., the dry injector 500 has an upper portion 560 and a lower portion 570, along with a contoured surface 530 that are similar to the corresponding features of airflow devices 200 and dry injectors 50 previously discussed. The dry injector 500 further includes a number of nitrous outlet ports 576 that are fed nitrous oxide from inner ends 577a that communicate with a nitrous chamber 574 in a manner previously described. Finally, the dry injector 500 incorporates a fastener opening 562 for rotatably fixing the dry injector 500 to the plenum floor 20, and particularly a fixation feature 23 therein, in the manner previously described.

In addition, the dry injector 500 shown in FIGS. 25-28 depicts another embodiment of mountable devices 2 according to the present disclosure. In particular, the dry injector 500, upon being coupled to the plenum floor 20 also retains an extended base 590 therebetween. This extended base 590 provides a surface extending between an inner edge 591a and an outer edge 591b, whereby the dry injector 500 is configured to be retained within an opening 592 defined in the extended base 590, wherein the base 532 of the dry injector 500 is supported upon a ledge 594 within the opening 592. In this regard, coupling the dry injector 500 to the plenum floor 20 also fixes the extended base 590 to the plenum floor 20 without further fasteners or coupling features.

It should be recognized that this configuration enables a user to further optimize the flow of air into the intake runner 30 through use of various extended bases 590, which in the present case include intake runner guides 596 that substantially align with the intake runners 30. This also allows further optimization of the system 1, whereby the same dry injector 500 may be used with a number of different extended bases 590 as needed. This embodiment further separates elements of the mountable device 2 into smaller subsets, whereby the size of a combined dry injector 500 and an extended base 590 may not otherwise fit through the upper mount 16 if coupled in advance. Moreover, the present disclosure permits the use of an extended base 590 that is too large to rotate without interference by the divider walls 32, whereby the extended base 590 may remain rotationally stationary as the mountable device 2 is rotated during installation.

It should be recognized that other shapes and configurations for extended bases 590 are also anticipated by the present disclosure, as is the incorporation of an extended base 590 with a wet injector 100 or an airflow device 200 as previously described.

Figure 16:
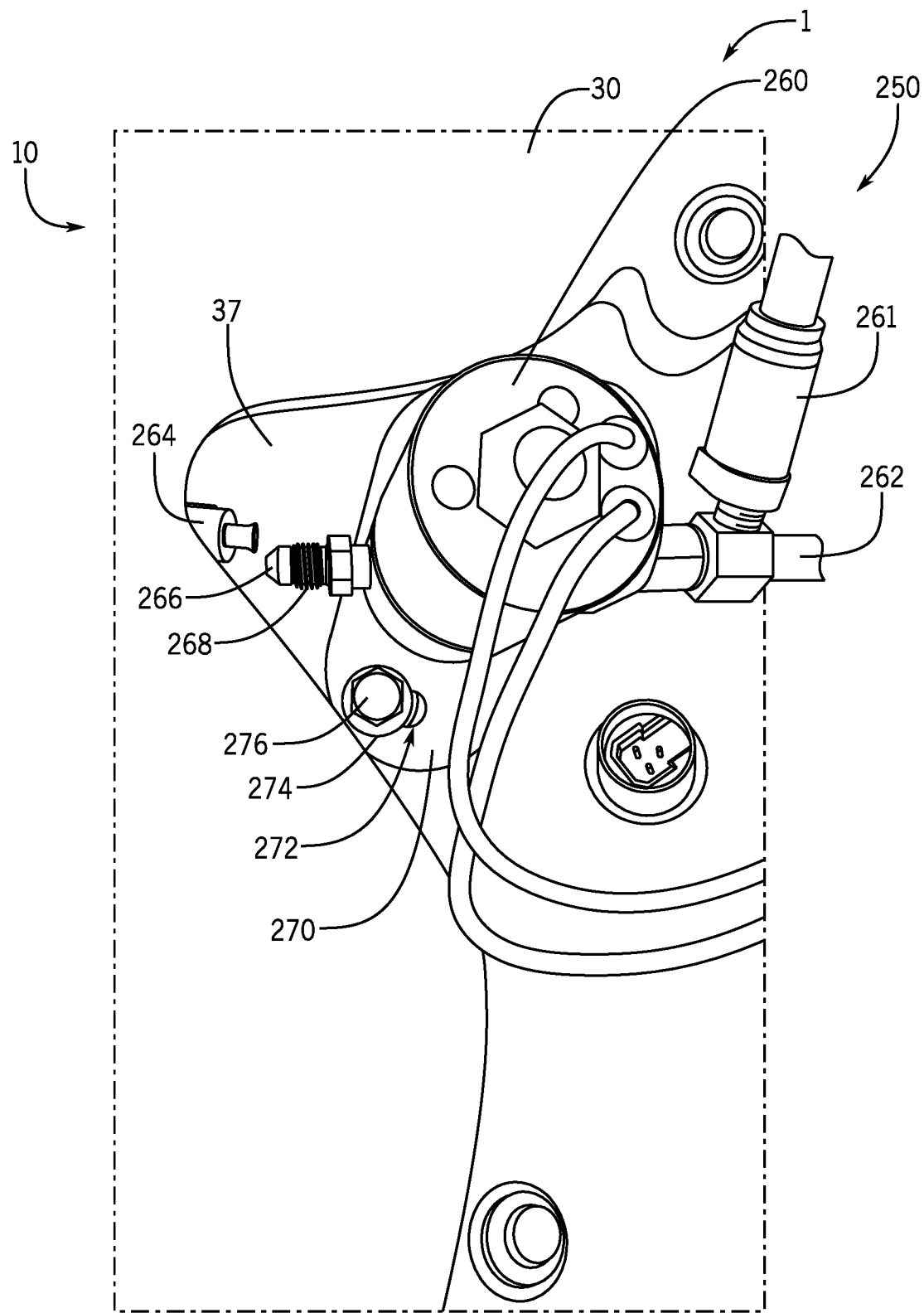
FIG. 16 is a top view of an auxiliary mounting system for mounting a solenoid to the intake manifold in embodiments of systems in accordance with the present disclosure.

The present disclosure further relates to the addition of features for configuring intake manifolds 10 within the disclosed systems 1 and methods. In particular, these relate to the installation of a solenoid 260 to control the supply of nitrous oxide to the dry injector 50 using the presently disclosed systems 1 and methods. As shown in FIG. 16, the solenoid 260 may be fed nitrous oxide via a source line 262, which in some cases is monitored by various sensors 261, in the customary manner. The present inventor has identified shortcomings of devices known in the art with regard to mounting the solenoid 260 (or other flow control mechanisms, such as computer controlled flow valves that can replace common solenoids 260 and nitrous jets 266). For example, the puck 40 device previously, and others known in the art rely upon a solenoid mounting bracket being fastened between the upper mount 16 for the air inlet device and air inlet device itself. An example of this type of mount is available here: http://www.nitrousoutlet.com/media/galerie/p/u/puckinintake.png. Therefore, some of the solenoid mounting brackets known in the art do inherently raise the height of the air inlet device, once again creating the potential for clearance issues. Furthermore, including a solenoid mounting bracket between the upper mount 16 and the air inlet device itself creates the need for at least 1 additional gasket; one on top or below the solenoid mounting bracket. The solenoid mounting bracket and gaskets necessarily increase the cost and complexity for a user to install or modify a mountable device 2 within the system 1 and also increases the risk of leaks and failures.

FIG. 16 depicts a system 1 having an auxiliary mounting system 250 for mounting the solenoid 260 and related components according to the present disclosure. The auxiliary mounting system 250 presently disclosed includes two solenoid bracket mounting bosses 274 on the valley pan 37 or lower mount 36, each being configured to constrain one side of a solenoid bracket 270 for mounting a solenoid 260 thereon. In the embodiment shown, the solenoid bracket 270 is coupled to the solenoid bracket mounting boss 274 with fasteners 276 (shown here as bolts and washers) from above. The solenoid 260 is coupled to the solenoid bracket 270 using additional fasteners, such as bolts and washers, from below (not shown).

The present embodiment provides that the solenoid bracket 270 has a slot 272 defined in at least one side to allow some movement of the solenoid bracket 270 relative to the valley pan 37 in which the solenoid bracket 270 is coupled via the solenoid bracket mounting bosses 274. In certain embodiments, the second side of the solenoid bracket 270 (not shown) does not have a slot 272, but a circular hole for mounting the solenoid bracket 270. In this regard, the solenoid bracket 270 is pivotable about the hole to the extent permitted by the slot 272.

By providing the solenoid bracket mounting bosses 274 and the solenoid bracket 270 in the system 1 presently disclosed, the solenoid 260 can be pivoted away from the nitrous input line 264 to replace a nitrous jet 266 without fully removing the solenoid 260 or solenoid bracket 270. Likewise, the location of the solenoid bracket mounting bosses 274 is such that once the desired nitrous jet 266 is installed on the solenoid fitting 268, the solenoid 260 and the nitrous jet 266 are automatically positioned in alignment with the nitrous input line 264, simply by pivoting the solenoid bracket 270 back again. This reduces the need for extra length in the nitrous input line 264, saving costs, reducing clutter, and preventing strain of the components following installation.

Furthermore, the solenoid bracket 270 itself requires very little material in contrast to the plate type solenoid mounting brackets known in the art that are installed between the upper mount 16 and the air inlet device, further reducing costs and complexity. Likewise, the presently disclosed system 1 requires no additional gaskets and, therefore, avoids further risks of leaks between the upper mount 16 and the air inlet device itself.

Moreover, the presently disclosed design provides for a more hidden solenoid over using the mounting brackets presently known in the art. This not only protects the solenoid when work is being performed on the engine 6, but also provides improved aesthetics when viewing the engine 6. Within the context of competitions at a race track, the solenoid may not even be seen.

It should be known that the solenoid bracket mounting bosses may be provided in alternative locations of the intake manifold, including for example on one or more of the intake runners. Likewise, a preferred embodiment includes another pair of solenoid bracket mounting bosses 274 such that two solenoids 260 (one for nitrous oxide and one for fuel) can be easily installed for wet injector 100 systems.

As previously described, the present inventor has identified that the systems 1 disclosed herein include a wide variety of mechanisms for coupling an mountable device 2 to a plenum floor 20 of an intake manifold 10. While previous embodiments largely focused on threaded engagement between the plenum opening 24 and the plenum floor 20 and the lower portion 70 of a dry injector 50, lower portion 140 of a wet injector 100, or lower portion 220 of an airflow device 200, for example, other forms of engagement (rotational and otherwise) are also anticipated by the present disclosure. For example, FIGS. 17-19 depict a further embodiment of a dry injector 50 configured to be mounted to a plenum floor 20 through rotation, but locking without the use of a captured set screw 64 and fixation feature 23.

As shown, the dry injector 50 includes a number of tabs 79 on the lower portion 70, which are receivable in tab receivers 28 within the plenum opening 24. The tabs 79 have an upper surface that, in the present embodiment, includes a first segment 179*a* and a second segment 179*b*. The first segment 179*a* is ramped upwardly, whereas the second segment 179*b* is substantially horizontal, and thereby essentially parallel to the upper portion 60. The second segment 179*b* is configured to be at least as long as the portion of plenum floor 20 between adjacent tab receivers 28. In this regard, the dry injector 50 is inserted into the plenum opening 24 with the tab 79 in alignment with the tab receivers 28.

The dry injector 50 is then rotated such that the underside of the plenum floor 20 adjacent to the plenum tab receiver 28 first contacts the ramped portion of the first segment 179a of the tabs 79, causing increasing compression between the dry injector 50 and the plenum floor 20 upon initial rotation. After the peak between the first segment 179a and second segment 179b is reached, the dry injector 50 continues to rotate until the portion of the plenum floor 20 between the tab receivers 28 is substantially aligned with the second segment 179b of the tabs 79. The peak between the first segment 179a and the second segment 179b of the tabs 79 therefore creates a detent-like feature that resists rotation of the dry injector 50 in an opposite direction to that previously discussed thereby retaining the dry injector 50 on the plenum floor 20. As previously described, the present embodiment does not require the addition of a captured set screw 64 or other fastener to prevent rotation between the dry injector 50 and the plenum floor 20, but nonetheless insures consistent alignment between the nitrous outlet ports 76 and the intake runners 30 in the same manner previously described.

Figure 17:
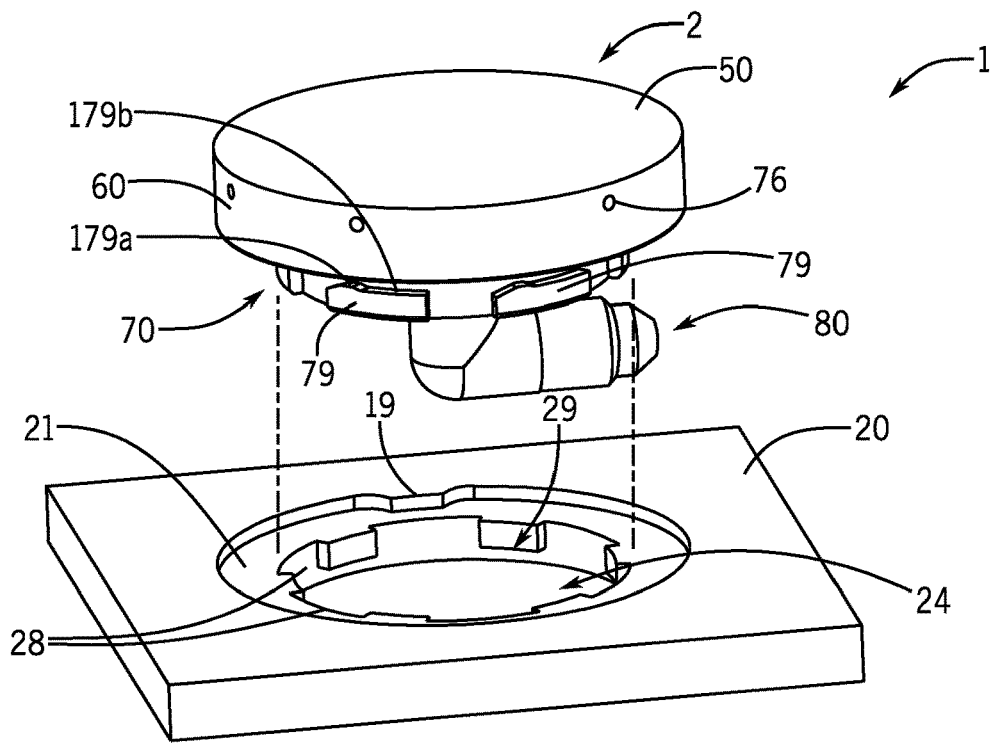
FIGS. 17 and 18 are isometric views of another embodiment of a system including another mountable device.
Figure 18:
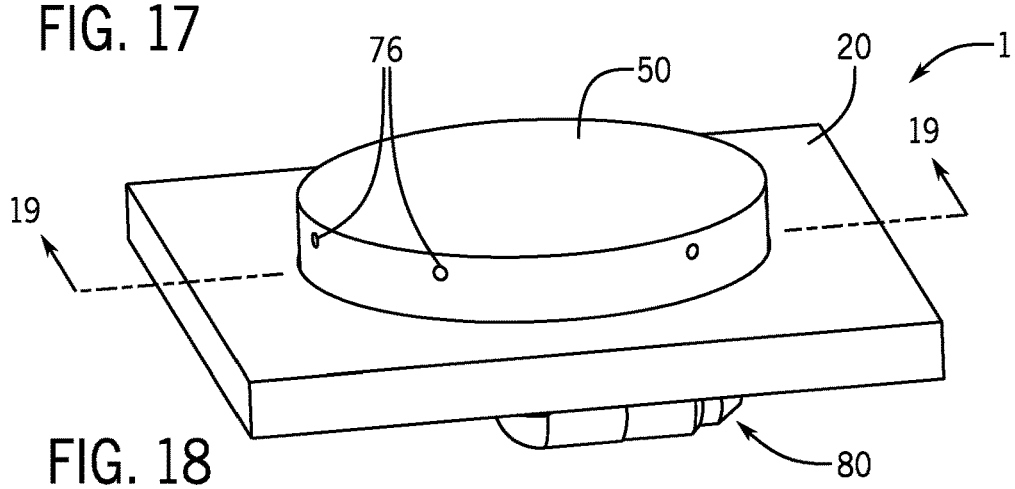
Figure 19:
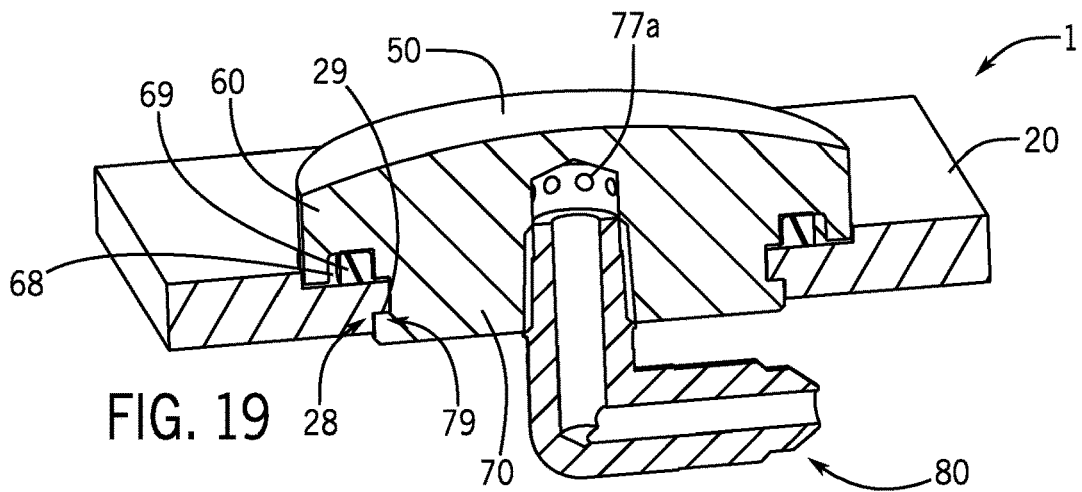
FIG. 19 is a sectional view taken along 19-19 in FIG. 18.

It should further be recognized that in the embodiment of FIGS. 17-19, the plenum floor 20 further defines a recess 21 in which the dry injector 50 wants coupled with the plenum floor 20. This, in addition to allowing the dry injector 50 to have a lower profile, provides for further alignment of the dry injector 50 and the plenum floor 20 by virtue of an alignment feature 19, which provides a poke yoke to ensure that the dry injector 50 is properly aligned without relying upon the user confirming this alignment or following a rule such as that the nitrous fitting 80 must be parallel to the broader length of the intake manifold 10 when rotated to be coupled thereon, for example. In embodiments having an alignment feature 19, it will be recognized that a corresponding alignment feature would also be provided on the corresponding side of the lower portion 70 (not shown) to receive and engage with the alignment feature 19 while only allowing enough rotation to engine or disengage the dry injector 50.

Figure 21:
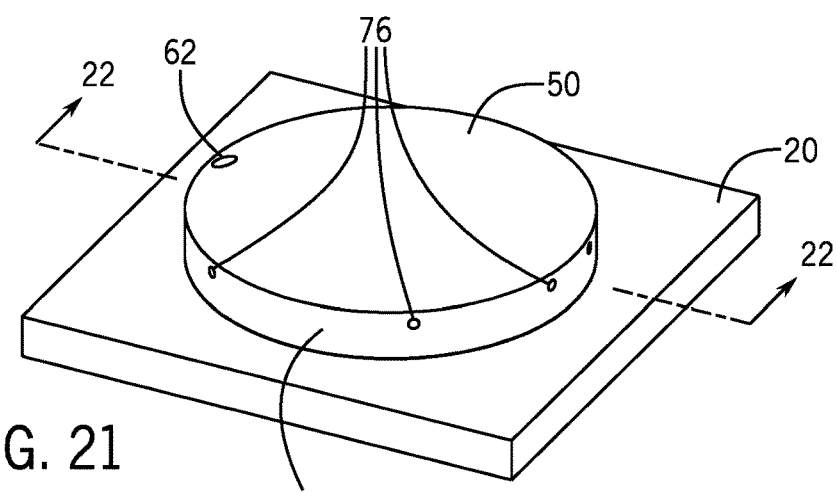

FIGS. 20-22 depict a similar embodiment in which a dry injector 50 is coupled through a partial rotation, but this time returning to the use of a captured set screw 64 or other fastener with a fixation feature 23 in the plenum floor 20. In the embodiment shown, the dry injector 50 once again includes tabs 79 on the lower portion 70 that engage with tab receivers 28 in the plenum floor 20. Proper alignment between the dry injector 50 and the plenum floor 20 is now provided by alignment between the captured set screw 64 and the fixation feature 23, which in this case is embedded within a slot 27 defined within the plenum floor 20. This slot 27 allows the dry injector 50 to be placed on the plenum floor 20 when the tabs 79 are aligned with the tab receivers 28 in the plenum floor 20, in which case the longer protruding captured set screw 64 may otherwise interfere with flush engagement therebetween. Once the dry injector 50 is rotated to the proper locking position, and thereby aligned with the intake runners 30, the captured set screw 64 can then be rotated to engage with the fixation feature 23, thereby preventing subsequent rotation of the dry injector 50 relative to the plenum floor 20.

Further embodiments of dry injectors 50 are also anticipated by the present disclosure, which also applies to wet injectors 100 and other mountable devices 2 that incorporate features of airflow devices 200. In the embodiment shown in FIG. 23, the dry injector 450 is configured for a threaded engagement between the lower portion 70 and the plenum opening 24 of the plenum floor 20, as previously discussed. A coupling head 451, shown here to be a hex head on the top 452 of the dry injector 450, is provided such that a tool can be used to rotate the dry injector 450 into position on the plenum floor 20. The dry injector 450 is rotated until tight, then backed off until the fastener opening 62 is in alignment with the fixation feature 23 in the plenum floor 20 as previously described. In this regard the embodiment of FIG. 23 is similar to those previously discussed.

Figure 23:
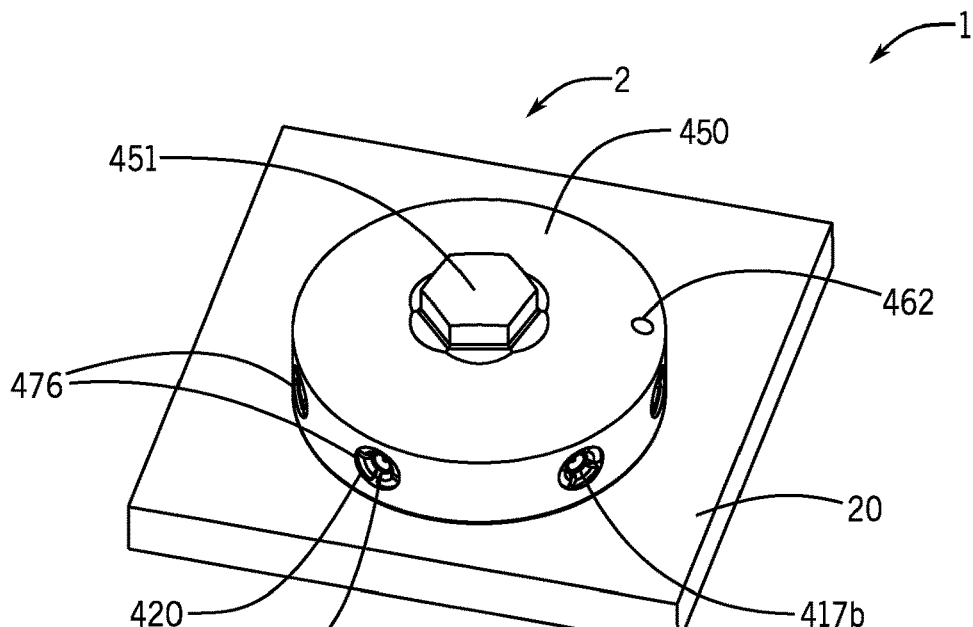
FIG. 23 is an isometric view of another embodiment of the system including another mountable device, the mountable device being installed within the system in accordance with the present disclosure.
Figure 24:
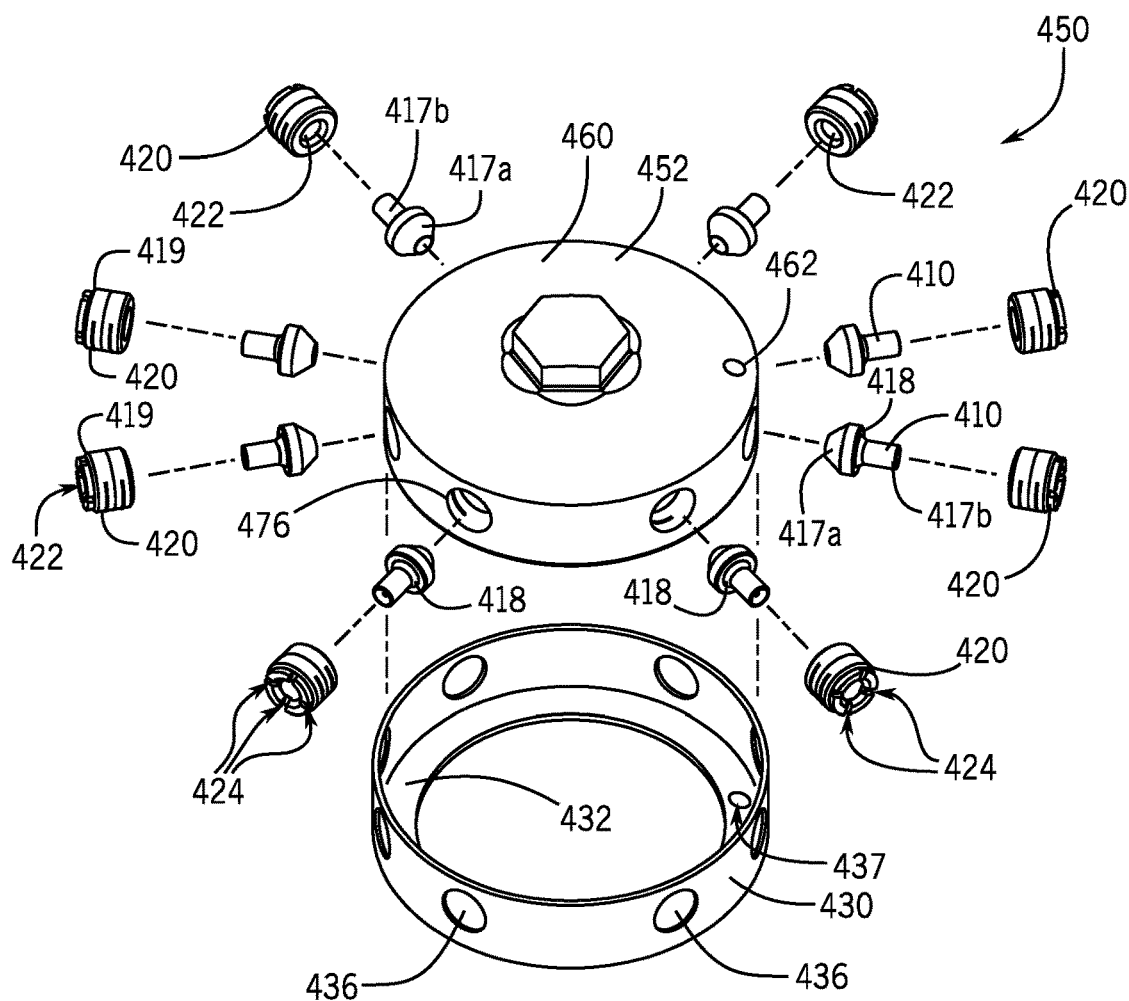
FIG. 24 is an exploded view of the mountable device in FIG. 23.
Figure 25:
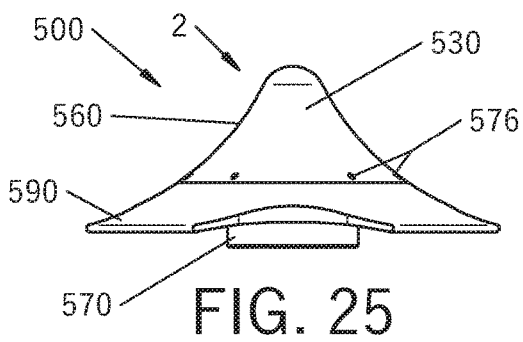
FIGS. 25-28 depict another mountable device configured to be incorporated into embodiments of the presently disclosed systems in accordance with the present disclosure, specifically, a combined dry injector and airflow device having an additional extended base.
Figure 26:
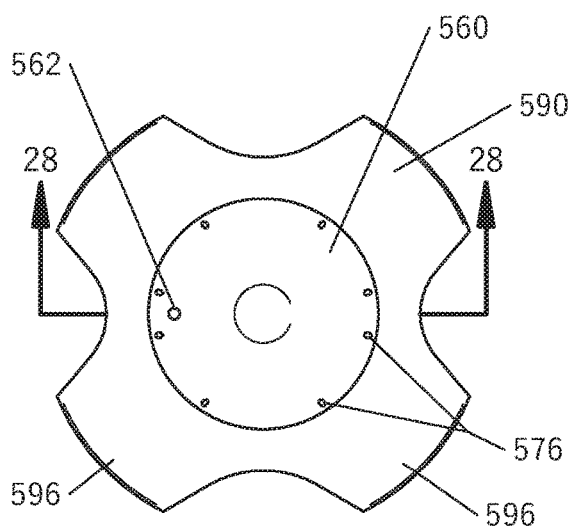
Figure 27:
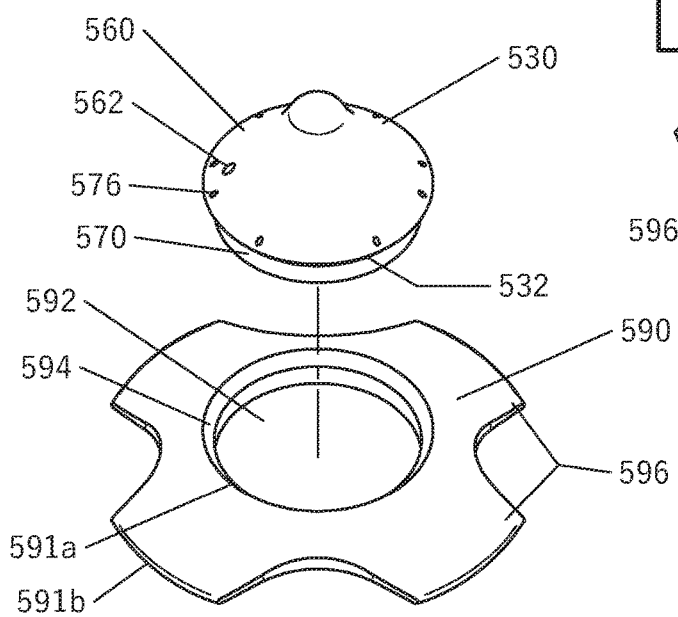
Figure 28:
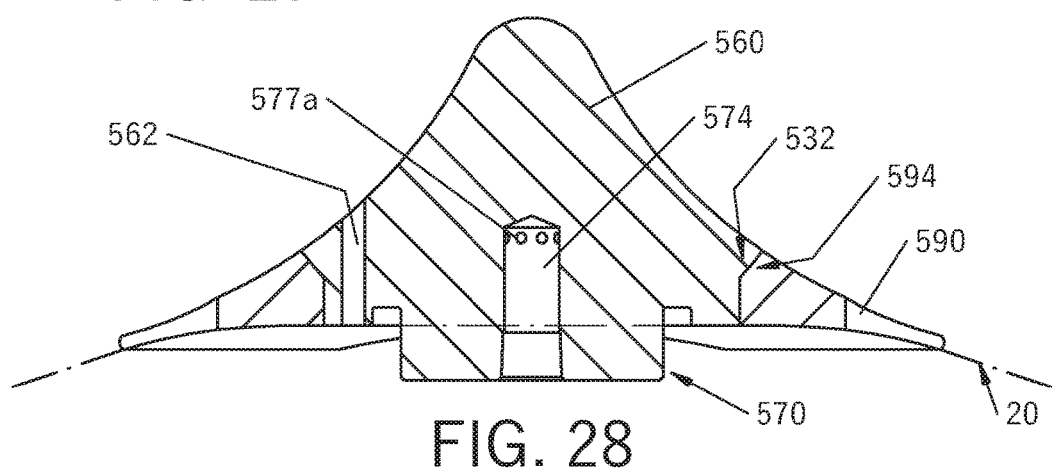

However, FIGS. 23-24 further depict the configurability of the dry injector 450 for further optimization in use with the presently disclosed system 1. In addition to the dry injector 450 defining nitrous outlet ports 476 therein, as previously discussed, the present embodiment allows for the insertion of interchangeable nozzles 410 that are placed within the nitrous outlet ports 476 and retained therein by retention collars 420, rotatably engaged by tool fittings 424. In certain embodiments, the retention collars 420 and the nozzles 410 are integrally formed or manufactured, such as threading on the nozzles 410.

The tool fittings 424 of certain embodiments allow the retention collar 420 to be installed or removed using a standard, flathead screwdriver or a spanner socket. The nozzles 410, which include off the shelf models presently available in the market, have an inner end 417a having a substantially conical shape, which transitions to an outer end 417b after a shelf 418 configured to engage with the retention collar 420. In certain embodiments, the outer ends 417b are received within openings 422 in the retention collars 420. In this manner, the user is able to insert nozzles 410 as appropriate to optimize performance (and/or size) to each individual cylinder separately, allowing further configurability of the dry injector 450 itself, in addition to other aspects of the presently disclosed system 1. With devices presently known in the art, optimizing at the individual cylinder level is only possible with direct port type systems (i.e., not through the puck 40, Stealth Nozzle, or most plate-type injectors); however, these direct port type systems are very expensive and cumbersome with lots of parts, as previously stated.

It should be recognized that when nitrous jets are incorporated as the nozzles 410 for flow control, the nitrous jet 266 need not be included with the solenoid fitting 268 at the solenoid 260. Instead, a non-jet-type fitting may be used, allowing the solenoid 260 to provide full flow to the nitrous input line 264.

Once the nozzles 410 are placed within the nitrous outlet ports 476 and retained in place by the retention collars 420, the assembly is placed within a ring 430 defining a series of openings 436, which would engage with lips 419 on each of the retention collars 420 to prevent any of the components from decoupling from the dry injector 450 if they were to loosen. The ring 430 further includes a floor 432 such that when the dry injector 450 is coupled to the plenum floor 20, the ring 430 is effectively coupled to the plenum floor 20 as well. The floor 432 may be configured to not interfere with any gaskets between the dry injector 450 and the plenum floor 20 to allow the sealed engagement previously described. A fastener opening 462 within the upper portion 460, along with a fastener opening 437 within the ring 430, ensure alignment between the nitrous outlet ports 476, the ring openings 436, and the intake runners 30 in the manner previously described. Other shapes, mechanisms, and configurations for ensuring this engagement are also anticipated by the present disclosure, as previously described.

The present inventor has identified that, without this ring 430 and its engagement with the dry injector 450, substantial obstacles would exist in providing a dry injector 450 with this level of configurability, including use of interchangeable nozzles 410. In particular, the embodiment shown provides many small pieces, including nozzles 410 and retention collars 420, which would otherwise be at risk of falling into the intake runners 30 and causing catastrophic damage to the engine 6. While it is conceivable that the segments could be fixed in place through use of epoxies, this precludes the interchangeability and optimization of interchanging the nozzles 410 as needed, effectively rendering the dry injector 450 to be the same as a dry injector 50 having fixed, non interchangeable nitrous outlet ports 76. Moreover, the process of epoxying these components requires further time delay and runs the risk of failure over time, through vibration, temperature fluctuation, and other harsh environmental conditions provided within the intake manifold 10.

In order to provide further configurability for the systems 1 presently disclosed, the present inventor has further developed embodiments providing for the easy and secure incorporation of mountable devices 2 on a plenum floor 20, including those having a shape or configuration not permitting coupling methods that require rotation. In the embodiment shown in FIGS. 29-31, the airflow device 350) is shown in conjunction with an intermediate adapter 300, which is positioned between the airflow device 350 and the plenum floor 20 in use. In particular, the intermediate adapter 300 has an upper portion 302 and a lower portion 310 that engage with the plenum floor 20 in the manner previously described. In particular, the present embodiment provides for a threaded opening 324 defined within the plenum floor 20 as previously described. Once rotated into position, the intermediate adapter 300 is prevented from rotating relative to the plenum floor 20 through engagement of a captured set screw 314 with a fixation feature 23 defined in the plenum floor 20 as previously described.

The airflow device 350 further includes a recess 320 defined within the base 232 that is configured to receive the locking device 330. The intermediate adapter 300 also locates locking feature 330, which in this case is a spring clip, which is captured between the intermediate adaptor 300 and the plenum floor 20 as previously described, similar to ring 430. The locking device 330 (shown here to be a spring clip) is configured to lockingly engage with the recess 320 of the airflow device 350 to retain the base 332 near the plenum floor 20 with the intermediate adapter 300, which is retained itself to the plenum floor 20. As previously described, gaskets 69 may be provided between the intermediate adapter 300 and the plenum floor 20. The intermediate adapter 300 may be semi-permanently installed on the plenum floor 20 in the manner previously described, providing for airflow devices 350 and other mountable devices 2 to be installed into the intermediate adapter 300 simply by manipulating the locking feature 330.

In certain embodiments, the locking feature 330 is a solid shape defined within the intermediate adaptor 300 (similar to the intermediate adaptor 300 and the locking feature 330 being combined into one single component). For example, the airflow device 350 could be made of a lightweight elastomer/composite material that would enable it to simply snap directly onto the intermediate adaptor 300 without a separate locking device 330.

It should be recognized that while the locking feature 330 is presently shown to be a spring clip, other mechanisms would also be known to one of ordinary skill in the art. For example, the locking feature 330 could include various clamps, cams, and other mechanisms for quickly engaging and releasing mountable devices 2, while still preventing the introduction of small pieces that could become dislodged from the intermediate adapter 300 to pose a risk of being lost into the intake runners 30 and causing damage to the engine 6.

The present inventor has identified the embodiment of FIGS. 29-31, and specifically the use of an intermediate adapter 300, allows a mountable device 2 that is shaped, sized, or otherwise configured such that it would not be rotatable within the space of the intake cavity 25 or upper mount 16 nonetheless be installed on a plenum floor 20 configured for rotational engagement between mountable devices 2 and the plenum floor 20. In other words, the embodiment presently shown permits an mountable device 2, such as a large pyramid shape, to be installed into a system 1 that is otherwise configured for rotational engagement with the plenum floor 20, as the intermediate adapter 300 is configured to be mounted with this rotational engagement, and then to engage with such an mountable device 2 through a vertical engagement with the locking features 330.

It should further be recognized that while the present disclosure generally discusses the injection of nitrous oxide, fuel, or the manipulation of airflow in an intake manifold 10, the foregoing also applies to the injection of other gases or liquids within an engine 6. For example, the presently disclosed systems 1 may be configured to inject a mixture of methanol and water (herein referred to as just methanol), whether in addition to nitrous oxide and/or fuel to cool the intake air charge and/or to increase the effective octane of the primary fuel. Methanol injection is commonly used in forced induction applications to make more power using standard fuels as a primary fuel. A dry injector 50 could be reconfigured to inject methanol. A wet injector 100 could be used to inject both nitrous oxide and methanol (or a separate second stage of dry nitrous). Other mountable devices disclosed herein could also provide this methanol injection with the proper exit ports similar to nitrous outlet ports 76 or 120 or fuel outlet ports 130 that also include the proper angle outlet as discussed below. As with the wet injector 100 previously discussed, the injection of methanol may be configured to mix with the nitrous oxide to form a single jet into the intake runners 30. The methanol injection could be also used alone to increase performance of the engine 6 under load along with other typical tuning measures associated with methanol/water injection known to a person skilled in the art. The central injection of the methanol would provide the same benefits of improved distribution of the methanol as it does with the nitrous injection. This would provide the benefits of a direct port methanol injection system without the expensive plumbing.

In certain embodiments, the methanol outlet ports, and specifically the outer ends thereof, include a 80°-100° cone angle in order to generate a mist. In other embodiments, methanol outlet ports are provided in a manner that does not directly combine with the nitrous oxide or fuel in the paths of the intake runner 30, but nonetheless is injected into the intake runners 30 to provide the desired function.

As with the mountable devices 2 previously discussed, the embodiments incorporate methanol injection would provide the same safety features to prevent damage to the engine 6 via the intake runners 30, and also preclude modification of the intake manifold 10 in order to install, remove, or otherwise configure a mountable device to incorporating a methanol injection feature. Likewise, the input lines for the methanol mixture may be routed between the valley pan 37 and the plenum floor 20 such that no modification is needed to the valley pan 37 or lower mount 36 more generally. Likewise, as previously discussed with respect to the mountable devices 2 detailed above, devices incorporating methanol injection do not require modification to the intake manifold 10, nor even removal of the intake manifold 10 for assembly, disassembly, or any changes in the configuration.

It should further be recognized that, in place of using an intermediate adapter 300, certain embodiments of systems 1 anticipated herein directly incorporate the locking features 330 into the plenum floor 20 itself, providing a press-down engagement between a mountable device 2 and the plenum floor 20 without the incorporation of a separate intermediate adapter 300.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other devices. It is to be expected that various equivalents, alternatives and modifications are possible within the scope of any appended claims.

I claim:

1. A system for optimizing performance of an engine having an air inlet device and a cylinder head, the system comprising:
an intake manifold comprising an upper mount, a plenum floor, a lower mount defining a plurality of intake openings, and a plurality of intake runners communicating between the plenum floor and the plurality of intake openings in the lower mount, wherein the upper mount is configured to be coupled to the air inlet device and the lower mount is configured to be coupled to the cylinder head such that the intake manifold provides air from the air inlet device to the cylinder head, and wherein the plenum floor defines a plenum opening;
a mountable device having an upper portion and a lower portion, wherein the entirety of the mountable device is configured to be inserted through the upper mount of the intake manifold and coupled to the plenum floor such that the mountable device covers the plenum opening, and such that at least the upper portion of the mountable device remains between the upper mount and the plenum floor; and
a fixation system that prevents the mountable device from decoupling from the plenum floor during operation of the engine, and wherein the fixation system prevents misalignment between the mountable device and the intake manifold;
wherein the mountable device is interchangeable without removing the intake manifold from the engine.

2. The system according to claim 1, wherein the fixation system comprises a fastener and recess defined in the plenum floor, wherein the mountable device defines a fastener opening configured to receive the fastener such that the fastener extends from the mountable device into the recess in the plenum floor.

3. The system according to claim 2, wherein the fastener is a threaded set screw that is captured in the fastener opening, and wherein the recess is defined only partially into the plenum floor.

4. The system according to claim 1, wherein the fixation system includes a plurality of tabs on the mountable device, wherein the plenum opening correspondingly defines a plurality of tab receivers configured to receive the plurality of tabs, and wherein the mountable device is configured to be coupled to the plenum floor by inserting the mountable device into the plenum opening when the plurality of tabs are aligned with the plurality of tab receivers and then rotating the mountable device such that the plurality of tabs and the plurality of tab receivers are out of alignment.

5. The system according to claim 1, wherein the mountable device is an injector having a nitrous fitting that defines a nitrous inlet port and plurality of nitrous outlet ports, wherein the injector is configured to inject nitrous oxide into the intake manifold via the plurality of nitrous outlet ports.

6. The system according to claim 5, wherein the plurality of nitrous outlet ports are defined such that when the injector is coupled to the plenum floor and fixed with the fixation system the plurality of nitrous outlet ports are aligned with the intake runners.

7. The system according to claim 6, wherein the plurality of intake runners comprises eight intake runners, and wherein the plurality of nitrous outlet ports comprises eight individual nitrous outlet ports that align with the eight intake runners.

8. The system according to claim 6, wherein the injector further has a fuel fitting that defines a fuel inlet port and wherein the injector has a plurality of fuel outlet ports, wherein the injector is further configured to inject fuel into the intake manifold via the plurality of fuel outlet ports.

9. The system according to claim 8, wherein the plurality of nitrous outlet ports comprises eight individual nitrous outlet ports, and wherein the plurality of fuel outlet ports comprises eight individual fuel outlet ports.

10. The system according to claim 8, wherein the plurality of nitrous outlet ports are configured to inject the nitrous oxide outwardly, and wherein the plurality of fuel outlet ports are configured to inject the fuel obliquely to the nitrous oxide such that the fuel and the nitrous oxide mix.

11. The system according to claim 5, wherein the plurality of nitrous outlet ports having inner ends that are opposite outer ends, wherein the inner ends are spaced apart equally to receive equal flows of nitrous oxide from the nitrous inlet port, and wherein the outer ends are spaced apart such that each aligns with one intake runner of the intake manifold.

12. The system according to claim 1, wherein the mountable device is an airflow director configured to modify how the air flows through the intake manifold, wherein the upper portion of the airflow director comprises a contoured surface that extends from a base that is coupled to the plenum floor.

13. The system according to claim 12, wherein the airflow director has a plurality of fins that extend radially outwardly from the contoured surface, and wherein the plurality of fins extend from a top of the airflow director to the base.

14. The system according to claim 1, wherein the mountable device is an intermediate adapter, and wherein the system further comprises an upper mountable device, wherein the upper mountable device is configured to be inserted through the upper mount of the intake manifold and coupled to the intermediate adapter.

15. The system according to claim 14, wherein the intermediate adapter includes a plurality of clips configured to lockingly engage with the upper mountable device when the upper mountable device is pressed downwardly onto the intermediate adapter.

16. The system according to claim 1, further comprising an auxiliary mounting system for mounting a solenoid to the intake manifold, the auxiliary mounting system comprising a threaded mounting boss on the intake manifold, a bracket configured to be coupled to the solenoid, and a fastener, wherein the bracket also defines a slot therethrough, and wherein the bracket is configured to be coupled to the threaded mounting boss by inserting the fastener through the slot and into engagement with the threaded mounting boss.

17. A mountable device configured to mount to an intake manifold having a plenum floor and an upper mount, the intake manifold being configured to be coupled to an engine, the mountable device comprising:
- an upper portion and a lower portion each insertable through the upper mount, wherein the lower portion is configured to be received within a plenum opening defined within the plenum floor when the mountable device is mounted to the plenum floor, and wherein the upper portion is configured to remain between the plenum floor and the upper mount when the mountable device is mounted to the plenum floor; and
- a fixation system configured to be engaged and disengaged through the upper mount of the intake manifold when the mountable device is mounted to the plenum floor, wherein the fixation system is configured to prevent the mountable device from dismounting from the plenum floor when engaged, wherein the fixation system is further configured to prevent misalignment between the mountable device and the intake manifold;
- wherein the mountable device is configured to be mounted and dismounted from the plenum floor while the intake manifold remains coupled to the engine.

18. The mountable device according to claim 17, wherein the mountable device is further configured to inject nitrous oxide into the engine, wherein the mountable device comprises a nitrous fitting defining a nitrous inlet port that is configured to receive the nitrous oxide from a nitrous oxide source, wherein the nitrous fitting extends downwardly from the lower portion of the mountable device, wherein the mountable device comprises a plurality of nitrous outlet ports defined within the upper portion, wherein the mountable device is configured to inject the nitrous oxide into the intake manifold via the plurality of nitrous outlet ports, and wherein the fixation system prevents misalignment between the plurality of nitrous outlet ports and the intake manifold.

19. The mountable device according to claim 18, wherein the plurality of nitrous outlet ports are each configured to receive a plurality of nozzles, wherein the plurality of nozzles are configured to inject the nitrous oxide, further comprising a retention system for retaining the plurality of nozzles within the plurality of nitrous outlet ports, and wherein each of the plurality of nozzles is independently interchangeable.

20. The mountable device according to claim 19, wherein the retention system comprises a plurality of retention collars that threadingly engage with the plurality of nitrous outlet ports to retain the plurality of nozzles therein, and wherein the retention system further comprises a ring configured to receive the mountable device, wherein when the mountable device is received within the ring, the ring prevents the plurality of retention collars from disengaging with the plurality of nitrous outlet ports, and wherein the mountable device prevents the ring from disengaging from the mountable device when coupled to the plenum floor.

21. The mountable device according to claim 18, further comprising a fuel fitting defining a fuel inlet port that is configured to receive fuel from a fuel source, wherein the upper portion of the mountable device further defines a plurality of fuel outlet ports each configured to inject the fuel from the fuel inlet port into the intake manifold.

22. An intake manifold that is configurable for optimizing performance of an engine having an air inlet device and a cylinder head by receiving a mountable device, the intake manifold comprising:
- an upper mount configured to be coupled to the air inlet device;
- a plenum floor positioned below the upper mount and defining an intake cavity therebetween, wherein the plenum floor defines a plenum opening that is configured to receive a lower portion of the mountable device such that the mountable device is coupled to the plenum floor within the intake cavity, wherein the plenum floor includes a fixation system configured to prevent the mountable device from upwardly exiting the plenum opening;
- a lower mount positioned below the plenum floor, wherein the lower mount defines a plurality of intake openings therethrough, and wherein the lower mount is configured to be coupled to the engine; and
- a plurality of intake runners each communicating between the intake cavity and at least one of the plurality of intake openings in the lower mount such that air flows from the air inlet device to the cylinder heads, wherein the fixation system is further configured to prevent misalignment between the mountable device and the intake runners;
- wherein the intake manifold is configured such that the entirety of the mountable device is insertable through the upper mount, and wherein the mountable device may be coupled and decoupled from the plenum floor while the intake manifold remains coupled to the engine.

23. The intake manifold according to claim 22, wherein the fixation system includes a plurality of tab receivers defined in the plenum floor that are configured to receive a plurality of tabs on the mountable device, and wherein the mountable device is configured to be coupled to the plenum floor by inserting the mountable device into the plenum opening when the plurality of tabs are aligned with the plurality of tab receivers and then rotating the mountable device such that the plurality of tabs and the plurality of tab receivers are out of alignment.

* * * * *